US008464232B2

(12) United States Patent
Urakhchin

(10) Patent No.: US 8,464,232 B2
(45) Date of Patent: Jun. 11, 2013

(54) COMPILER COMPILER SYSTEM WITH SYNTAX-CONTROLLED RUNTIME AND BINARY APPLICATION PROGRAMMING INTERFACES

(76) Inventor: Aleksandr F. Urakhchin, Naperville, IL (US)

( * ) Notice: Subject to any disclaimer, the term of this patent is extended or adjusted under 35 U.S.C. 154(b) by 423 days.

(21) Appl. No.: 12/930,073

(22) Filed: Dec. 27, 2010

(65) Prior Publication Data

US 2012/0167065 A1  Jun. 28, 2012

(51) Int. Cl.
*G06F 9/45* (2006.01)

(52) U.S. Cl.
USPC .......................................... 717/143; 717/140

(58) Field of Classification Search
USPC ......................................................... 717/143
See application file for complete search history.

(56) References Cited

U.S. PATENT DOCUMENTS

| | | | | |
|---|---|---|---|---|
| 5,276,880 A * | 1/1994 | Platoff et al. | ................. | 717/143 |
| 5,557,776 A * | 9/1996 | Brown et al. | ................. | 717/143 |
| 5,586,323 A | 12/1996 | Koizumi et al. | | |
| 5,881,290 A * | 3/1999 | Ansari et al. | ................. | 717/136 |
| 5,963,742 A * | 10/1999 | Williams | ..................... | 717/143 |
| 6,151,701 A * | 11/2000 | Humphreys et al. | .......... | 717/130 |
| 6,243,862 B1 * | 6/2001 | Lebow | .......................... | 717/131 |
| 6,367,068 B1 * | 4/2002 | Vaidyanathan et al. | ...... | 717/143 |
| 6,769,115 B1 * | 7/2004 | Oldman | ........................ | 717/126 |
| 7,370,091 B1 * | 5/2008 | Slaughter et al. | ............. | 709/220 |
| 7,634,763 B2 * | 12/2009 | Wain et al. | ..................... | 717/140 |
| 7,739,696 B2 * | 6/2010 | Wolfe et al. | ................... | 719/328 |
| 7,840,951 B1 * | 11/2010 | Wright et al. | .................. | 717/152 |
| 7,895,583 B2 * | 2/2011 | Szepesvary et al. | ........... | 717/143 |
| 8,359,582 B2 * | 1/2013 | Elliott | ........................... | 717/130 |
| 8,365,155 B2 * | 1/2013 | Rioux | ........................... | 717/143 |
| 8,407,675 B1 * | 3/2013 | Clark | ............................ | 717/131 |
| 2003/0023961 A1 * | 1/2003 | Barsness et al. | .............. | 717/152 |
| 2003/0192026 A1 * | 10/2003 | Szepesvary et al. | ........... | 717/100 |
| 2004/0088688 A1 * | 5/2004 | Hejlsberg et al. | ............. | 717/143 |
| 2006/0047690 A1 * | 3/2006 | Humphreys et al. | .......... | 707/102 |
| 2006/0130016 A1 * | 6/2006 | Wagner | ......................... | 717/136 |
| 2006/0212859 A1 * | 9/2006 | Parker et al. | ................... | 717/143 |

(Continued)

OTHER PUBLICATIONS

De Guzman, Joel et al., "Spirit 2.4," Boost software license available at http://www.boost.org/LICENSE_1_0.txt, 2001-2010.

(Continued)

*Primary Examiner* — Don Wong
*Assistant Examiner* — Theodore Hebert
(74) *Attorney, Agent, or Firm* — Ryndak & Suri LLP

(57) ABSTRACT

A compiler compiler system with a design paradigm different from traditional compiler compiler systems in many aspects. First, instead of parsing tree, compiler compiler runtime and binary are designed according to compiler compiler parsing model. Second, any semantics processing is totally separated from syntax processing. Third, the whole compilation process is defined as syntax processing and semantics processing followed by syntax processing performed under compiler compiler management supervision. Fourth, syntax processing has two phases: building compiler compiler runtime, and converting compiler compiler runtime into compiler compiler binary with available option to convert back compiler compiler binary to compiler compiler runtime. Fifth, compiler compiler runtime and binary syntax-controlled APIs are defined in terms of syntax. Sixth, there are formal methods de-compiling compiler compiler runtime and/or binary into original program text accordingly to syntax. Seventh, compiler compiler runtime and binary with their syntax-controlled APIs serve as a multiplatform for obfuscation, security, binary files processing, and program-to-program communication.

17 Claims, 28 Drawing Sheets

U.S. PATENT DOCUMENTS

| | | | |
|---|---|---|---|
| 2007/0055966 A1* | 3/2007 | Waddington et al. | 717/144 |
| 2007/0074080 A1* | 3/2007 | FitzGerald | 714/45 |
| 2007/0079299 A1* | 4/2007 | Daly | 717/141 |
| 2007/0240137 A1* | 10/2007 | Archambault et al. | 717/140 |
| 2008/0066062 A1* | 3/2008 | Zatloukal et al. | 717/143 |
| 2008/0281580 A1* | 11/2008 | Zabokritski | 704/9 |
| 2008/0307384 A1* | 12/2008 | Perham | 717/104 |
| 2009/0083699 A1* | 3/2009 | Santhanam | 717/107 |
| 2009/0144697 A1* | 6/2009 | Foley et al. | 717/110 |
| 2009/0254892 A1* | 10/2009 | Yamashita | 717/146 |
| 2010/0037213 A1 | 2/2010 | Meijer et al. | |
| 2010/0070953 A1* | 3/2010 | Velten et al. | 717/140 |
| 2010/0083223 A1* | 4/2010 | Chouinard et al. | 717/110 |
| 2010/0146494 A1* | 6/2010 | Gellerich et al. | 717/143 |
| 2010/0325619 A1* | 12/2010 | Song et al. | 717/143 |
| 2011/0010696 A1* | 1/2011 | Lobo et al. | 717/151 |
| 2011/0138373 A1* | 6/2011 | Lane et al. | 717/157 |
| 2011/0197174 A1* | 8/2011 | Wu et al. | 717/104 |

OTHER PUBLICATIONS

Cohen, W.E., "Automatic Construction of Optimizing, Parallelizing Compilers from Specifications," Purdue University, doctoral thesis submitted Dec. 1994.

Parr, T.J. et al., "ANTLR: A Predicatied LL(k) Parser Generator," John Wiley & Sons, Ltd. 1995.

Parr, T.J., "Language Translation Using PCCTS and C++ (A Reference Guide)," Parr Research Corporation, internet release Jun. 26, 1995.

* cited by examiner

COMPILER COMPILER SYSTEM WITH SYNTAX-CONTROLLED RUNTIME AND BINARY APPLICATION PROGRAMMING INTERFACES

BACKGROUND OF THE INVENTION

The present invention relates to information technology, and more specifically, to the generation of source code from formal descriptions that can be compiled and linked, creating an executable program.

In applications performing compiler constructions those formal descriptions are defined in terms of context-free grammars. Such tools take a definition of context-free grammar usually in Backus-Naur Form (BNF) and generate a source code of compiler components; and that compiler is able to process source code according to the input grammar definition. Such tools are called compiler compilers or compiler generators. One of the earliest and still most common form of compiler compiler is a parser generator. In this case, the compiler compiler takes a grammar definition and generates parser source code. Also, a traditional compiler compiler generating parser source code from a grammar specification has another component that takes regular expressions and generates a tokenizer capable of processing specified tokens as a sequence of characters.

Compiler compilers as parser and tokenizer generators have been implemented since the late 1960's.

When a generated parser executes its actions during parsing a source program in accordance with a language grammar, it builds some form of parsing tree. A developer who implements a compiler based on conventional compiler compiler technology is responsible for writing code in terms of a parsing tree and some attributes assigned to parsing tree nodes.

An ideal compiler compiler is supposed to take an input grammar specification and generate source code in automatic mode without any further manual procedures. Unfortunately this is far from what current information technology can offer in compiler compiler products available for developers.

SUMMARY OF THE INVENTION

According to one embodiment of the present invention, a compiler compiler system includes compiler compiler executable program, compiler compiler management, compiler compiler runtime, compiler compiler binary, compiler compiler generator, compiler compiler source grammar definition language, and compiler compiler parsing model.

In another embodiment of the present invention, parsing results processing is totally separated from any subsequent semantics processing; parsing results are not represented in the form of any parsing tree; and parsing results are represented in the form of compiler compiler runtime that can be formally converted into/from compiler compiler binary.

In another embodiment of the present invention, target language defined in compiler compiler source grammar definition language as a source file is compiled by compiler compiler executable program, and a target parser and related source files are generated totally automatically providing to the target compiler a basic set of compile and de-compile operations.

In another embodiment of the present invention, the compiler compiler runtime and binary have a common compiler compiler parsing model that considers parsing results to be represented in the form of entities such as Context, Name, Symbol, and Rule and their relationships. That model itself is another embodiment of the present invention, i.e., an alternative view to a traditional parsing tree. The compiler compiler runtime implements the model in efficient form required by parser performing create, update, search, and other low level operations in terms of Context, Name, Symbol, and Rule classes and their relationships. The compiler compiler binary implements the model in efficient form providing read only operations having all data allocated in a vector of Tag instances but still is logically equivalent to the compiler compiler runtime.

In another embodiment of the present invention, a compiler compiler binary is a multiplatform data exchange protocol that allows interaction between programs running on different platforms, running on different operating systems, and built using different programming languages such as C, C++, C#, Java, Objective C, Ruby, Pyton, Perl, and others.

In another embodiment of the present invention, a compiler compiler system can be used for binary files processing. In this case, a corresponding binary file format has to be designed in the form of compiler compiler source grammar definition language specification. After that, a custom convertor from binary file format into compiler compiler runtime format is implemented. Having a compiler compiler runtime built for a binary file with a given format allows all other compiler compiler phases to work automatically without any extra code development.

In another embodiment of the present invention, an input compiler compiler binary can be formally transformed using a transformation algorithm into/from an output compiler compiler binary providing generic operations for applications such as obfuscation, security/access control, and content management. The transformation algorithm may be any suitable transformation algorithm typically used for obfuscation, access control, content management, or any other suitable algorithm as appropriate to the application. Consider a credit card account number represented in compiler compiler source grammar definition language as a sequence of digits, each of them represented as an integerToken. Then at the compiler compiler binary level the account number will be represented as a sequence of integerToken tokens. A simple obfuscation algorithm can transform those integerToken token values into different values in the output compiler compiler binary before transmitting output compiler compiler binary over the wire, protecting the account number, with subsequent de-obfuscation on the receiving side. Those algorithms can be changed dynamically also. For security control, compiler compiler binary can be transformed by adding user information with subsequent validation. Consider an audio or video file to be converted into compiler compiler binary. After that conversion, any custom transformations are possible including security control and obfuscation for content protection. Also, any kind of advertising incorporated into compiler compiler binary is possible with programmed options enabling/disabling ads.

In another embodiment of the present invention, compiler compiler management, generator, runtime and binary source code are compiled into a compiler compiler foundation library that is used in compiler compiler executable program and any other target compiler built by means of a compiler compiler system.

In another embodiment of the present invention, for any compiler compiler source grammar language description, the compiler compiler executable program generates code that is compiled into a generated library and a target compiler executable program is compiled and built with the compiler compiler foundation library and generated library. Built this way, the target compiler executable program has default compile and de-compile operations ready. All semantics processing can be done as independent subsequent operations implemented using a compiler compiler binary application programming interface (API).

In another embodiment of the present invention, the compiler compiler source grammar definition language is defined using the same source grammar definition language that allows a bootstrapping method to be used for implementing compiler compiler executable program using itself. In other words, the compiler compiler generated code for a given meta grammar description is compiled into a generated library and a newly created compiler compiler executable program is compiled and built with compiler compiler foundation library and generated library. Built this way, the newly created compiler executable program has compile and de-compile operations ready. All semantics processing in this case is done as a code generation for parser and related generated source files implemented using compiler compiler binary API. If the abbreviation CCSGDL stands for compiler compiler source grammar definition language, then meta grammar is CCSGDL for CCSGDL.

DETAILED DESCRIPTION OF THE INVENTION

Figure 1:
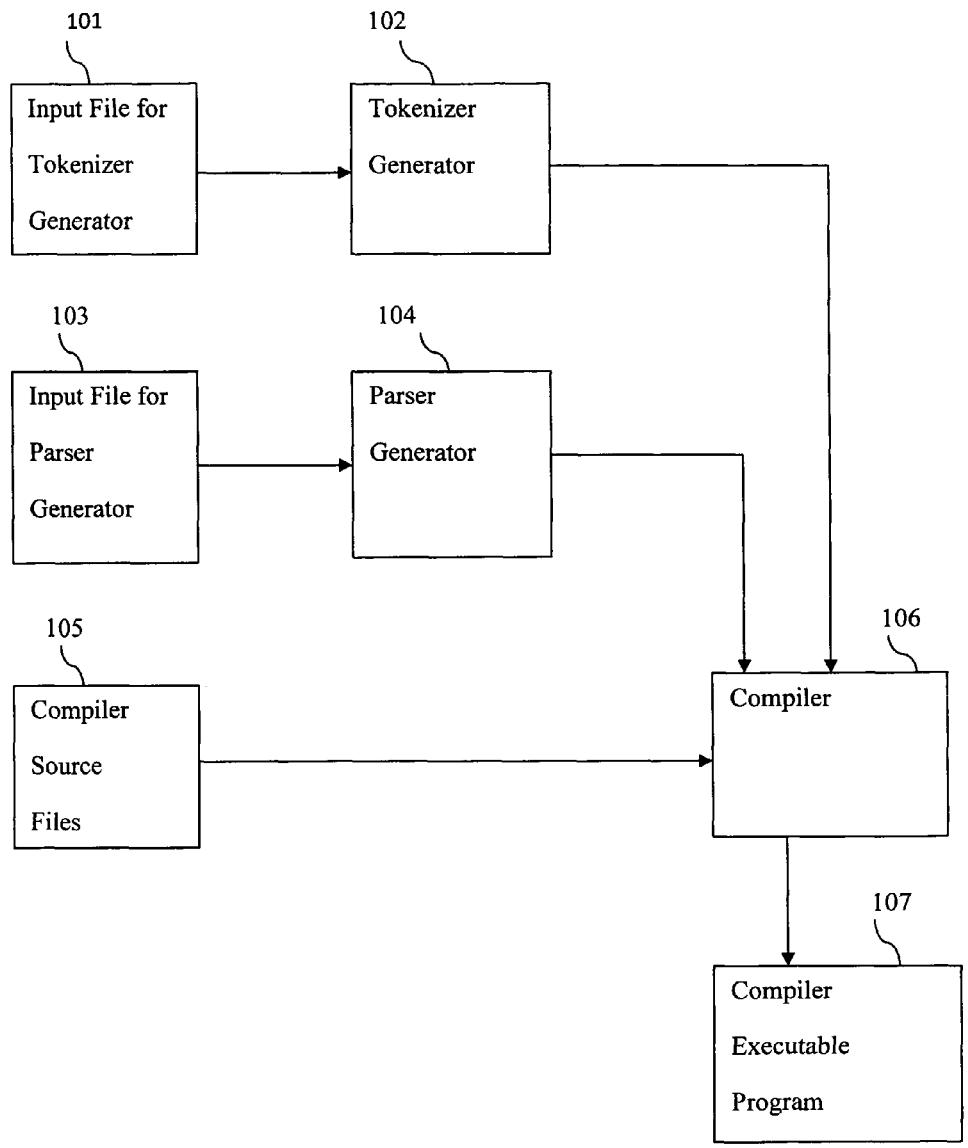
FIG. 1 shows a prior art compiler compiler such as YACC or GNU BISON.

FIG. 1 shows an example of a prior art compiler compiler system. A compiler executable program 107 is a final step here and it is done as a compiling and linking of a compiler code 106 that consists of compiler source files 105, generated compiler parser, and generated compiler tokenizer. The generated compiler parser is an output of executing parser generator 104 having input file for parser generator 103. The generated compiler tokenizer is an output of executing a tokenizer generator 102 having input file for tokenizer generator.

The input file for parser generator 103 contains a grammar definition in the form of a few sections such as implementation language declarations, compiler compiler declarations, compiler compiler grammar rules specification, and additional implementation language code. For YACC and GNU BISON the implementation language is C language.

The compiler compiler grammar rules specification is a sequence of individual grammar rules. Each grammar rule is defined as a non-terminal on the left side and a potentially empty sequence of terminals and non-terminals on the right side followed by actions. The grammar rule actions are specified as implementation language code with additional features the compiler compiler can understand and convert into implementation language code during generation. Those additional features are related to attributes attached to parsing tree nodes. Usually those attributes have a prefix '$' and the compiler compiler acts like a specialized preprocessor that for each rule finds all occurrences of '$' and generates corresponding implementation language code based on compiler compiler executing environment rules for processing parsing results.

For each grammar rule specified actions are executed every time the parser recognizes that the rule is supposed to be invoked during parsing.

The input file for the tokenizer generator mainly consists of language tokens definitions in the form of token name and token regular expression specifying a valid set of characters comprising the token.

To summarize, the prior art compiler compiler system model forces a compiler developer to define compilation tasks in the form of individual grammar rule actions for the isolated parsing tree context identified with the given rule invocation. As a result, when parsing is done a parsing tree is built along with a custom environment implemented by the compiler developer. Subsequent compilation phases followed by parsing are implemented in terms of that parsing tree and custom environment.

Figure 2:
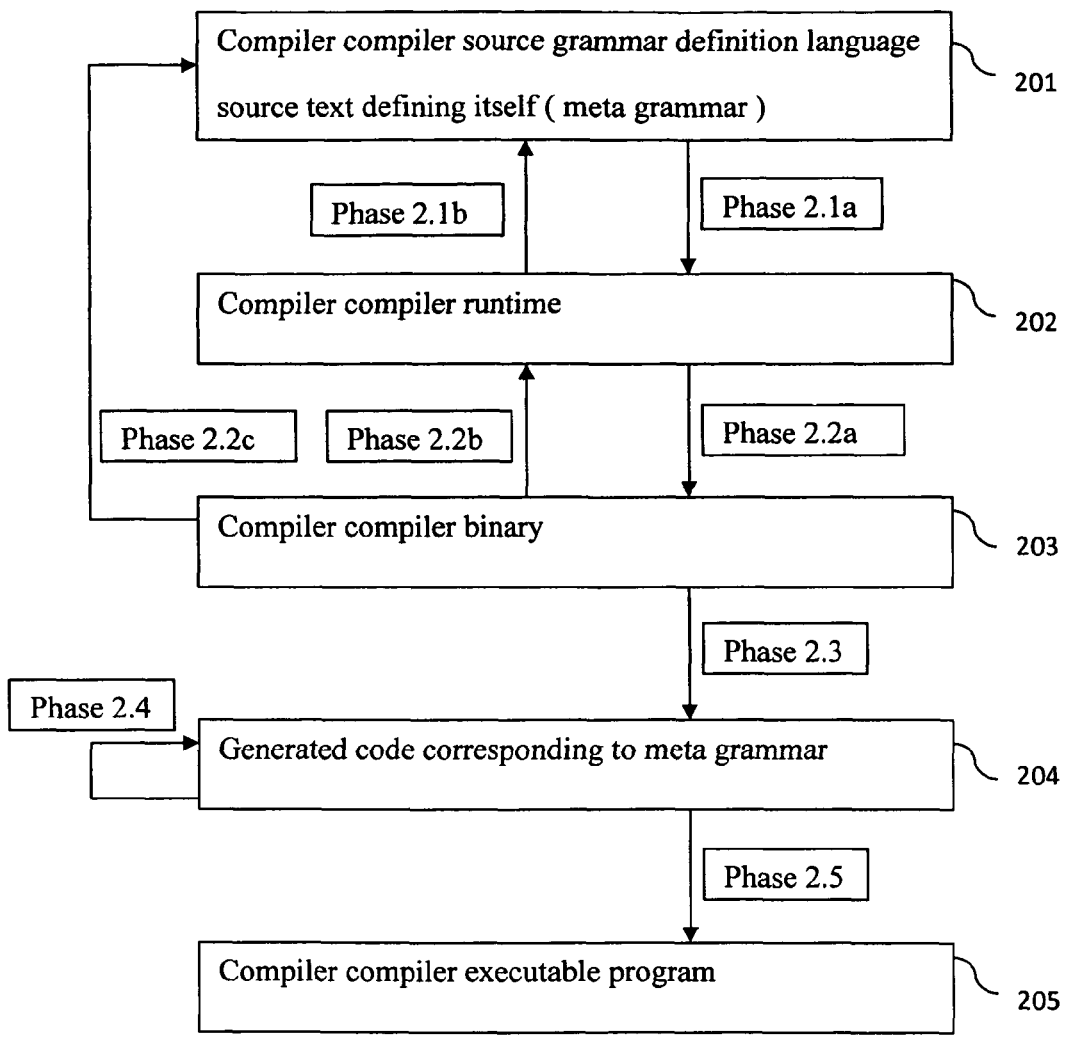
FIG. 2 shows compiler compiler system phases according to the invention for building the compiler compiler itself.

FIG. 2 shows the present invention compiler compiler system phases for building itself. A compiler compiler executable program 205 takes compiler compiler source grammar definition language source text defining itself (meta grammar) 201 and performs a phase 2.1a generating compiler compiler runtime 202 for meta grammar 201. Compiler compiler executable program 205 has an option to de-compile meta grammar generated compiler compiler runtime 202 into a text file (not shown) containing meta grammar executing phase 2.1b. This newly de-compiled meta grammar as a text is identical to meta grammar 201 except for some differences related to supported indentation rules.

Compiler compiler executable program 205 for meta grammar 201 performs phase 2.2a generating compiler compiler binary 203 for compiler compiler runtime 202. The phase 2.2a is implemented as a formal procedure that converts compiler compiler runtime 202 into compiler compiler binary 203. Compiler compiler executable program 205 has an option to de-compile meta grammar from generated compiler compiler binary 203 into a text file (not shown) containing meta grammar executing phase 2.2c. This newly de-compiled meta grammar as a text is identical to meta grammar 201 except for some differences related to supported indentation rules. Compiler compiler executable program 205 has an option to re-create a compiler compiler runtime that is identical to original compiler compiler runtime 202 having compiler compiler binary 203 executing phase 2.2b.

Compiler compiler executable program 205 performs phase 2.3 creating a compiler compiler generated code 204 corresponding to meta grammar 201. The compiler compiler source grammar definition language consists of a grammar name section followed by a sequence of rules where the first rule is also a grammar axiom. As used herein, the grammar name section consists of a single identifier that defines a name of grammar. As an example, when C++ compiler compiler executable program 205 takes the following meta grammar source file:

```
(meta
  (grammar ::=
           0 =" METAACTBEG( );"=
           '(' grammarNameDef
               { rule }
           ')'
           0 =" METAACTEND( );"=
)
(grammarNameDef ::=   identifier
)
(rule ::=     '(' nterm '::=' right ')'
)
(nterm       ::=    identifier
)
(right ::=    { element }
)
(element ::=          identAlt | alternative | identMiss | iteration | action
)
(action      ::=    integerToken '=' { stringToken } '='
)
(actions ::= '=' { action } '='
)
(identAlt ::= ntermtermact { Altpart }
)
(Altpart ::=  '|' ntermtermact
)
(ntermtermact   ::=       ntermterm [ actions ]
)
(ntermterm      ::=    nterm | termToken
)
(alternative    ::=    '(' identAlt ')'
)
(identMiss      ::=    '[' identAlt ']'
)
(iteration      ::=    '{' iterItemact iterItems '}'
)
(iterItems      ::=    { altIterItem }
)
(altIterItem    ::=    '|' iterItemact
)
(iterItemact    ::=    iterItem [ actions ]
)
(iterItem       ::=    nterm | maybeNterm
)
(maybeNterm     ::=    '<' nterm '>'
)
)
``` as a result of phase 2.3 the following C++ source files are generated:

metaGenerator.h
metaKeyWordDefinition.h
metaParser.h
metaGenerator.cc
metaKeyWordDefinition.cc
metaParser.cc
metaMakeGenerators.cc Note, that the 'meta' prefix in file names corresponds to the grammar name—the first section identifier in source grammar definition language. Note also that
0="METAACTBEG( );"=
0="METAACTEND( );"=
are used as a special macro substitution actions defined in form of integer number followed by sequence of string literals enclosed in '=' and '='. Further elements and rules are explained in the following paragraphs.

The compiler compiler source grammar definition language elements such as '(' and ')' are grammar terminals defined as a string literal with enclosed single quotes.

The compiler compiler source grammar definition language element such as
{rule}
is BNF extension called iteration meaning that enclosed by { and} non-terminal is actually may occur zero or any other number of times.

Note, that, e.g., rule (iterationExample ::= { element } )

is equivalent to rules (iterationExample ::= element iterationExample )
(iterationExample ::= )

The compiler compiler source grammar definition language rule (rule ::=   '(' nterm '::=' right ')'
)

defines rule as a terminal '(' followed by non-terminal nterm followed by terminal '::=' followed by non-terminal right followed by terminal ')'.

The compiler compiler source grammar definition language rule (nterm    ::=   identifier
)

defines non-terminal nterm as identifier.

The compiler compiler source grammar definition language rule (right ::=   { element }
)

defines non-terminal right as an iteration of element non-terminals.

The compiler compiler source grammar definition language rule (element ::=   identAlt | alternative | identMiss | iteration | action
)

defines non-terminal element as an alternative of non-terminals on the right side of rule definition separated by '|'. The alternative is BNF extension similar to iteration extension; it is used in cases when non-terminal on the left side of rule definition can be one of non-terminals from the right side.

Note, that, e.g., rule
(alternativeExample::=A|B|C|Z)
is equivalent to rules
(alternativeExample::=A)
(alternativeExample::=B)
(alternativeExample::=C)
(alternativeExample::=Z)

The compiler compiler source grammar definition language rule (action    ::=   integerToken '=' { stringToken } '='
)

defines non-terminal action as an integerToken followed by terminal '=' followed by iteration of stringToken followed by terminal '='. Here integerToken and stringToken are another compiler compiler source grammar definition language reserved key words similar to identifier. integerToken defines token that holds integer value. stringToken defines token that holds string literal value as an arbitrary sequence of any characters enclosed with double quotes, i.e., ".

The compiler compiler source grammar definition language rule (actions ::= '=' { action } '='
)

defines non-terminal actions as a iteration of action enclosed with '='.

The compiler compiler source grammar definition language rule (identAlt ::= ntermtermact { Altpart }
)

defines non-terminal identAlt as a ntermtermact followed by iteration of Altpart non-terminals.

The compiler compiler source grammar definition language rule (Altpart ::=   '|' ntermtermact
)

defines non-terminal Altpart as a terminal '|' followed by non-terminal ntermtermact.

The compiler compiler source grammar definition language rule (ntermtermact    ::=   ntermterm [ actions ]
)

defines non-terminal ntermtermact as a non-terminal ntermterm followed by [actions] meaning that non-terminal actions may be omitted. Non-terminal enclosed with [ and] is another compiler compiler source grammar definition language BNF extension representing elements that can be omitted. Note, that, e.g., rule (ommitedElementExample ::= A [ W ])

is equivalent to rules:

(ommitedElementExample ::= A Welement )
(Welement::= W )
(Welement::= )

The compiler compiler source grammar definition language rule (ntermterm ::=   nterm | termToken
)

defines non-terminal ntermterm as an alternative of nterm of term Token. nterm is defined above.
termToken is another compiler compiler source grammar definition language reserved key word that defines terminal token specification as a string literal enclosed with single quotes.
The compiler compiler source grammar definition language rule (alternative ::=   '(' identAlt ')'
)

defines non-terminal alternative as an identAlt enclosed with terminals '(' and ')'.
The compiler compiler source grammar definition language rule (identMiss ::=   '[' identAlt ']'
)

defines non-terminal identMiss as an identAlt enclosed with terminals '[' and ']'.
The compiler compiler source grammar definition language rule (iteration ::=   '{' iterItemact iterItems '}'
)

defines non-terminal iteration as an iterItemact followed by non-terminal iterItems enclosed with terminals '{' and '}'.
The compiler compiler source grammar definition language rule (iterItems ::=   { altIterItem }
)

defines non-terminal iterItems as an iteration of altIterItem non-terminals.
The compiler compiler source grammar definition language rule (altIterItem ::=   '|' iterItemact
)

defines non-terminal altIterItem as terminal '|' followed by non-terminal iterItemact.
The compiler compiler source grammar definition language rule (iterItemact ::=   iterItem [ actions ]
)

defines non-terminal iterItemact as non-terminal iterItem followed by [actions].
The compiler compiler source grammar definition language rule (iterItem   ::=   nterm | maybeNterm
)

defines non-terminal iterItem as an alternative of non-terminals nterm and maybeNterm.
The compiler compiler source grammar definition language rule (maybeNterm   ::=   '<' nterm '>'
)

defines non-terminal maybeNterm as non-terminal nterm enclosed between terminals '<' and '>'. The compiler compiler source grammar definition language iteration is actually defined as a sequence of terminals or non-terminals may be followed by actions, and also non-terminals may be enclosed between terminals '<' and '>' meaning that such non-terminal is allowed to be in iteration only zero or one time. Note, that, e.g., the rule (anotherIterationExampe :: = { A | B | <X> | <Z> } )

is equivalent to the rules (anotherIterationExampe :: = elem anotherIterationExampe )
(anotherIterationExampe :: = )
(elem ::= A | B | X | Z )

with the limitation that X and Z are allowed to be defined zero or one times only.
If phase 2.5 is performed for newly compiler compiler generated code corresponding to meta grammar 204, then a new default version of compiler compiler executable program 205 is created with default 'metaGenerator.cc' that has empty implementation. When that default version of compiler compiler executable program 205 is running it has all phase 2.1*a*, phase 2.1*b*, phase 2.2*a*, phase 2.2*b*, and phase 2.2*c* available to be executed.

The phase 2.3 is actually implemented in the '<prefix>Generator.cc' file. In case of the C++ compiler compiler system mentioned above, seven files are created automatically without any manual intervention from the developer, not only for meta grammar but also for any other grammar defined in the compiler compiler source grammar definition language. In other words, compiler compiler semantics processing is performed by phase 2.4 and it is done by the '<prefix>Generator.cc' file. That code is actually implemented on top of the generated initial default version.

Figure 3:
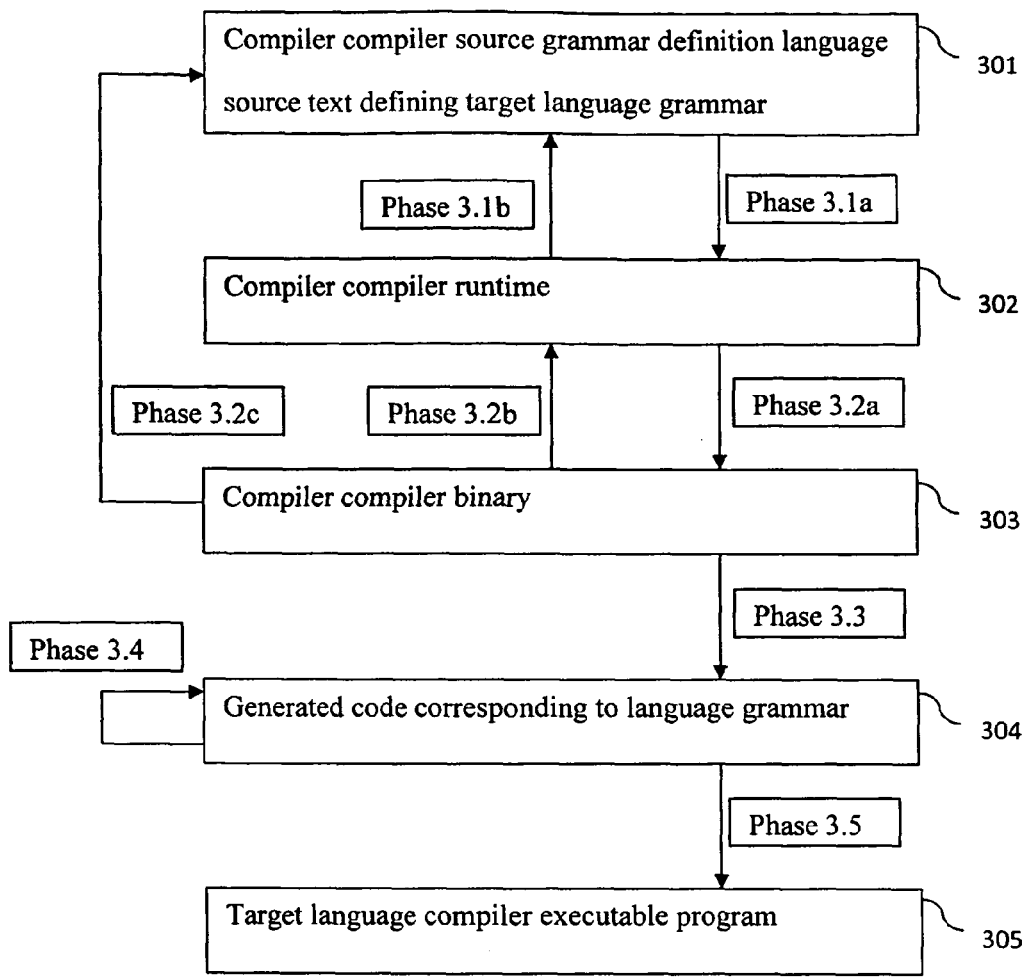
FIG. 3 shows compiler compiler system phases according to the invention for building a target compiler.

FIG. 3 shows compiler compiler system phases for building a target compiler. Compiler compiler executable program 205 takes compiler compiler source grammar definition language source text defining target language grammar 301 and performs phase 3.1*a* generating compiler compiler runtime 302. Compiler compiler executable program 205 has an option to de-compile target language grammar from generated compiler compiler runtime 302 into a text file containing compiler compiler source grammar definition language source text defining target language grammar executing phase 3.1*b*. This newly de-compiled target language grammar as a text is identical to target language grammar 301 except for some differences related to supported indentation rules.

Compiler compiler executable program 205 performs phase 3.2*a* generating compiler compiler binary 303 for target language grammar compiler compiler runtime 302. The phase 3.2*a* is implemented as a formal procedure that converts compiler compiler runtime 302 into compiler compiler binary 303. Compiler compiler executable program 205 has an option to de-compile target language grammar from generated compiler compiler binary 303 into a text file containing compiler compiler source grammar definition language source text defining target language grammar executing phase 3.2*c*. This newly de-compiled target language grammar as a text is identical to target language grammar 301 except for some differences related to supported indentation rules. Compiler compiler executable program 205 has an option to create compiler compiler runtime 302 having compiler compiler binary 303 executing phase 3.2*b*.

Compiler compiler executable program 205 performs phase 3.3 creating compiler compiler generated code 304 corresponding to target language grammar 301 directly from 303. When C++ compiler compiler executable program 205 takes target language grammar source file 301 the following C++ source files are generated:

<Prefix>Generator.h
<Prefix>KeyWordDefinition.h
<Prefix>Parser.h
<Prefix>Generator.cc
<Prefix>KeyWordDefinition.cc
<Prefix>Parser.cc
<Prefix>MakeGenerators.cc Note, that the <Prefix> prefix in file names corresponds to the grammar name—the first section identifier in source grammar definition language.

If phase 3.5 is performed for newly compiler compiler generated code corresponding to target language grammar 304, then a new default version of target language compiler executable program 305 is created with a default '<Prefix>Generator.cc' that has empty implementation. When that default version of target language compiler executable program 305 is running, it has all phase 3.1*a*, phase 3.1*b*, phase 3.2*a*, phase 3.2*b*, and phase 3.2*c* available to be executed. The phase 3.3 is actually implemented in '<Prefix>Generator.cc' file corresponding to target language grammar 301. In the case of the C++ compiler compiler system mentioned above, seven files are created automatically without any manual intervention from the developer, not only for meta grammar but also for any other grammar defined in the compiler compiler source grammar definition language. In other words, compiler compiler semantics processing is performed by phase 3.4, and it is done by the '<Prefix>Generator.cc' file corresponding to the target language compiler. That code is implemented on top of the generated initial default version with no manual actions. So, phase 3.3 performs the same steps as phase 2.3, but phase 3.4 is related to semantics processing of the target language compiler.

Figure 4:
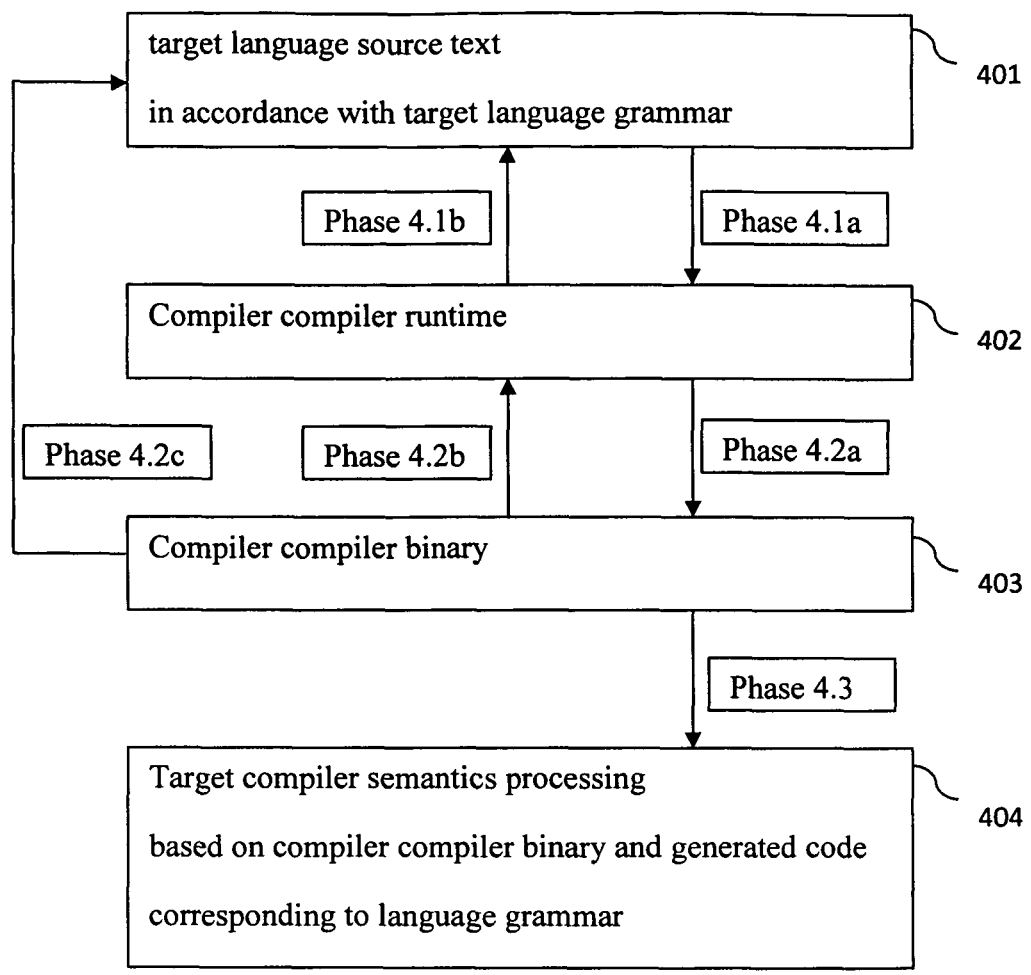
FIG. 4 shows target compiler phases when a target compiler is built by a compiler compiler system according to the invention.

FIG. 4 shows phases of target language compiler executable program 305. When the target language compiler executable program 305 takes target language source text in accordance with target language grammar 401 its parser goes through phase 4.1*a* creating a compiler compiler runtime 402 corresponding to target language grammar 401. In accordance with FIG. 3 target language compiler executable program 305 is built with the same set of operations as the compiler compiler executable program 205 shown in FIG. 2. The target language executable program 305 has an option to de-compile source program from generated compiler compiler runtime 402 into a source text file in accordance with target language grammar executing phase 4.1*b*. This newly de-compiled source text is identical to original target language grammar source text 401 except for some differences related to supported indentation rules.

Target language compiler executable program 305 performs phase 4.2*a* generating compiler compiler binary 403 for compiler compiler runtime 402. Phase 4.2*a* is implemented as a formal procedure that converts compiler compiler runtime 402 into compiler compiler binary 403. Target language compiler executable program 305 has an option to de-compile source text from generated compiler compiler binary 403 into a source text file in accordance with target language grammar 401 executing phase 4.2*c*. This newly de-compiled target language source text is identical to original target language source text 401 except for some differences related to supported indentation rules. The target language compiler executable program 305 has an option to create compiler compiler runtime 402 having compiler compiler binary 403 executing phase 4.2*b*.

The target language compiler executable program 305 performs phase 4.3, a target compiler semantics processing 404 based on compiler compiler binary 403.

To summarize FIG. 2, FIG. 3, and FIG. 4, compiler compiler management, generator, runtime and binary source code are compiled into a compiler compiler foundation library that is used when compiler compiler executable program compiles compiler compiler source grammar definitions and when target compiler executable program compiles target language programs.

Figure 5:
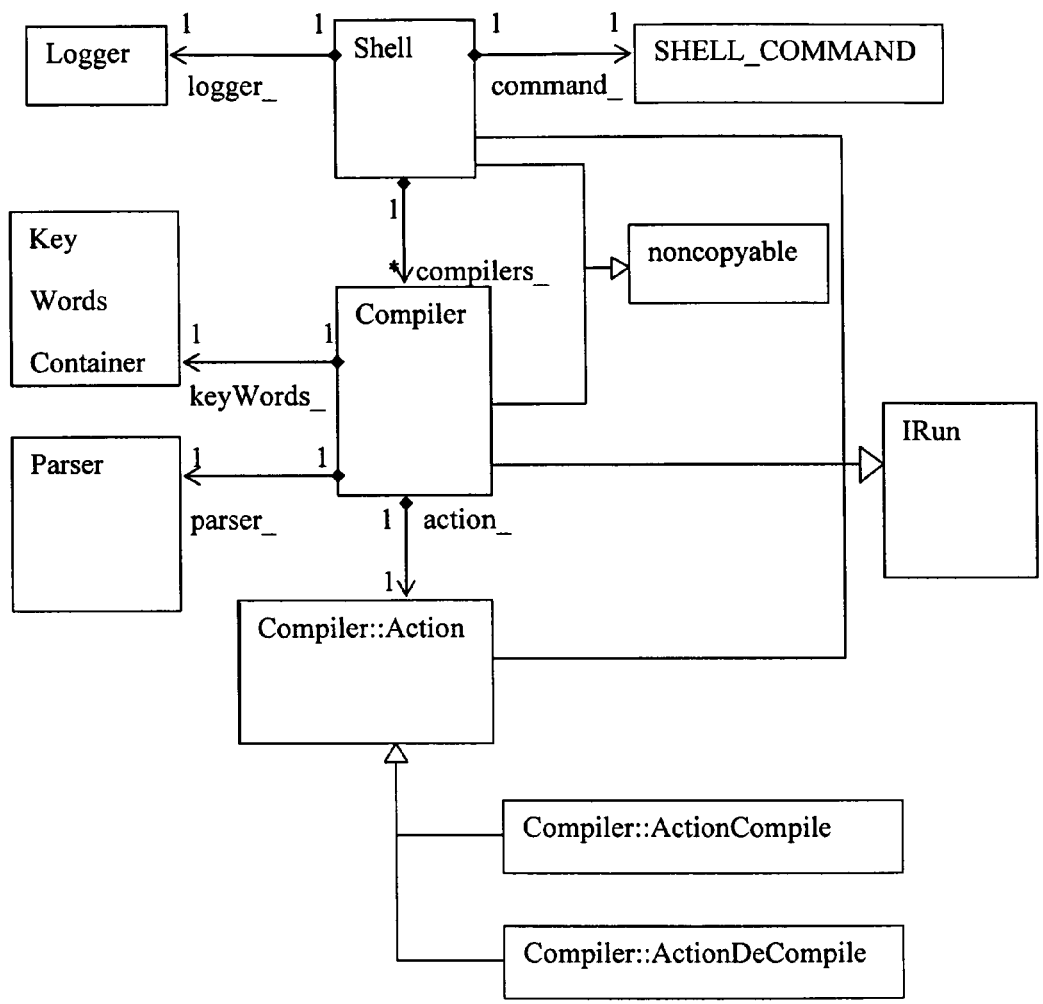
FIG. 5 shows a UML diagram of compiler compiler management classes such as Shell, Compiler, Parser, and other related classes and their relationships.

FIG. 5 shows a Unified Modeling Language (UML) diagram of compiler compiler management classes such as Logger, Shell, Compiler, Parser, and other related classes and their relationships. Logger class is defined for logging any activities performed during compilation/de-compilation. Shell class is defined for interacting with main routine performing compilation/de-compilation operations. Given Shell instance maintains a container of Compiler instances. Shell instance allocates Logger instance. Compiler class is defined for performing compilation/de-compilation operations under Shell control. Action abstract base class is defined for compilation/de-compilation interface to be instantiated inside Compiler. ActionCompile and ActionDecompile are classes derived from Action class to perform compilation/de-compilation operations. KeyWordsContainer class is defined to maintain set of names related to grammar such as predefined key word, tokens, key words, non-terminals. This class is instantiated inside Compiler instance. Parser class defines generic class as a parent for all generated parser classes for given grammar. This class is instantiated inside Compiler instance. IRun defines common interface in form of abstract class for Shell, Compiler, and Action classes. The compiler compiler executable program source code contains main function implementation by instantiating Shell with provided program arguments and executing run method of Shell instance.

Figure 6:
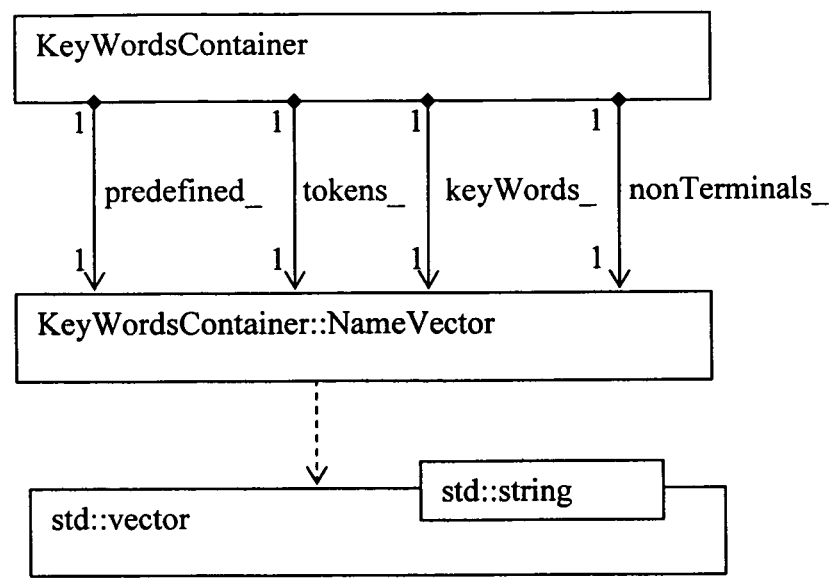
FIG. 6 shows a UML diagram of compiler compiler management KeyWordsContainer class.

FIG. 6 shows a UML diagram of compiler compiler management KeyWordsContainer class. It has inner type KeyWordsContainer::NameVector defined as std::vector<std::string>. KeyWordsContainer data members are of KeyWordsContainer::NameVector type; they are predefined_, tokens_, keyWords_, and nonTerminals_. So, all grammar symbol names are categorized into those four groups, the last one for grammar non-terminals, while the first three divide grammar terminals into predefined tokens such as identifier, integerToken, etc. . . . , tokens as sequences of any characters, and tokens as reserved key words.

Figure 7:
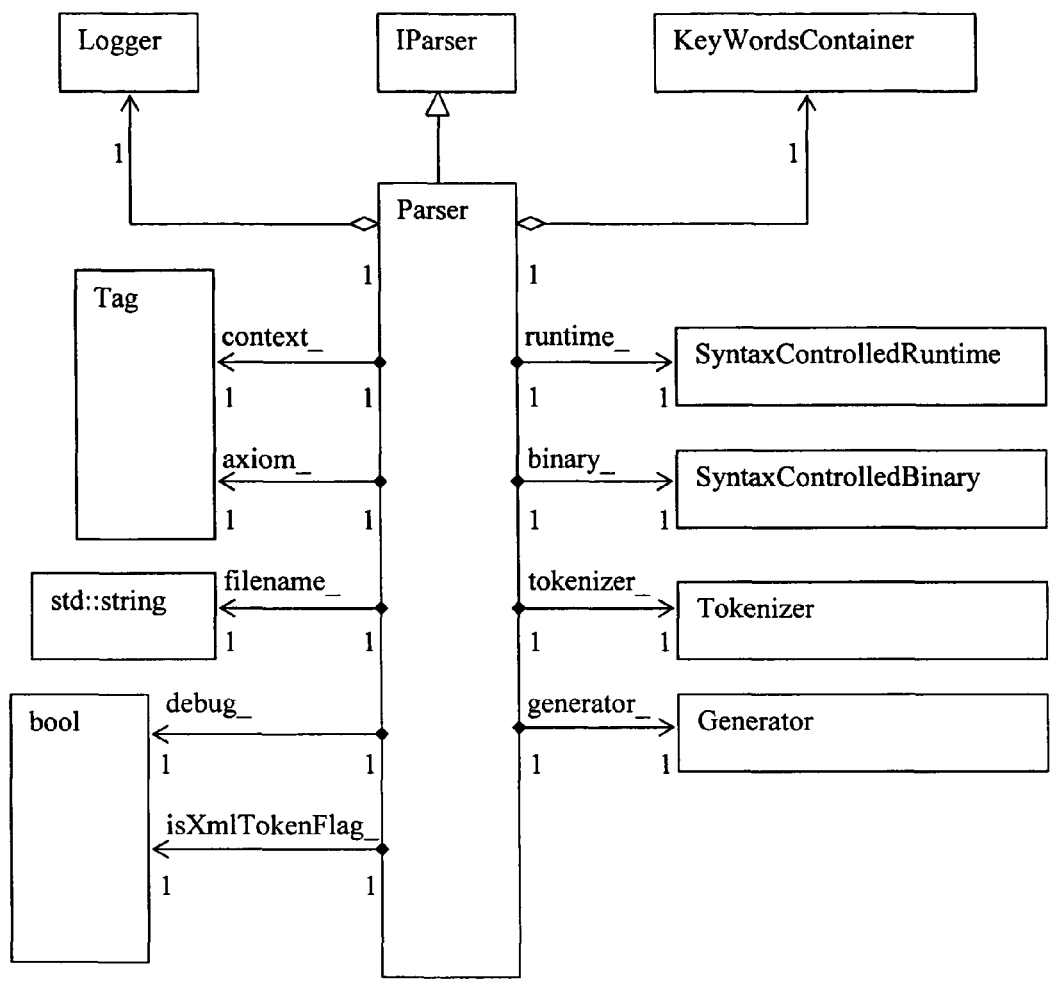
FIG. 7 shows a UML diagram of a compiler compiler management Parser class and its relationships with other classes.

FIG. 7 shows a UML diagram of compiler compiler management Parser class and its relationships with other classes. Parser class is derived from abstract class IParser that has few methods for compilation from file source with/without listing and from string source with/without listing. Parser class has references to Logger and KeyWordsContainer actually instantiated by Shell class and propagated to Parser through Compiler. Parser class has data members context_ and axiom_ of type Tag defined in C++ version at some namespace as follows:

```
#ifdef __CPPCC__TAG__32BITS__
    typedef unsigned long       UnsignedTag;
    typedef long       Tag;
    typedef float              Real;
    struct TypeInstance {
        UnsignedTag            symbolID:10;
        UnsignedTag            ruleID:22;
    };
#else
    typedef unsigned long long  UnsignedTag;
    typedef long long           Tag;
    typedef double              Real;
    struct TypeInstance {
        UnsignedTag            symbolID:16;
        UnsignedTag            ruleID:48;
    };
#endif
```

Along with Tag, UnsignedTag, Real, and TypeInstance are defined the same way. For 32 bit computer architecture all those types occupy a four-byte word; for 64 bit computer architecture all those types occupy an eight-byte word. TypeInstance instance in many cases is represented as a Tag value with subsequent fields packing/unpacking operations.

The Parser class instantiates some simple data members such as file name as a string class instance, as well as Boolean flags such as debugging flag, XML token indicator flag, etc. . . . shown in FIG. 7.

The Parser class shown on FIG. 7 also instantiates other important members such as runtime_ of type SyntaxControlledRuntime, a binary_ of type SyntaxControlledBinary, a tokenizer of type Tokenizer_, and a generator_ of type Generator.

Figure 8:
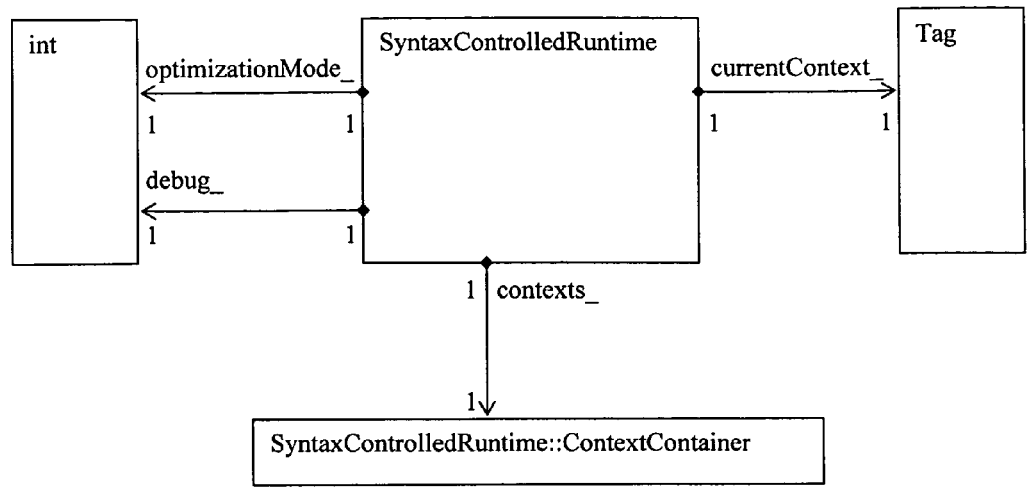
FIG. 8 shows a UML diagram of a compiler compiler runtime SyntaxControlledRuntime class.

FIG. 8 shows a UML diagram of compiler compiler runtime SyntaxControlledRuntime class. This class has currentContext_ data member of type Tag, debug_ and optimizationMode_flags of type int, and contexts_ of type SyntaxControlledRuntime::ContextContainer. The purpose of SyntaxControlledRuntime class is to define syntax-controlled runtime API as a collection of its methods and methods of inner classes and their relationships designed in accordance with compiler compiler parsing model.

As described in the following paragraphs with reference to FIGS. 9-18, the compiler compiler runtime syntax-controlled API, including various inner classes, is designed to perform the following set of operations to be invoked from any parser generated by compiler compiler system:

Create new 'Context' instance returning 'ContextID'.

Create new 'Rule' instance for the current 'Context' instance having 'SymbolID', returning 'Tag' instance actually mapped to 'TypeInstance' class instance with packed 'symbolID' and 'ruleID'.

Return 'Symbol' instance reference for the current 'Context' instance having 'SymbolID'.

Return 'Rule' instance for the current 'Context' instance having 'Tag' instance actually mapped to 'TypeInstance' class instance with packed 'symbolID' and 'ruleID'.

Modify 'Rule' instance dynamic part for the current 'Context' instance having 'Rule' instance reference and vector reference representing dynamic part.

Modify 'Rule' instance fixed part for the current 'Context' instance having 'Rule' instance reference and vector reference representing fixed part.

Create identifier representation having string representing identifier and returning identifier index.

Figure 9:
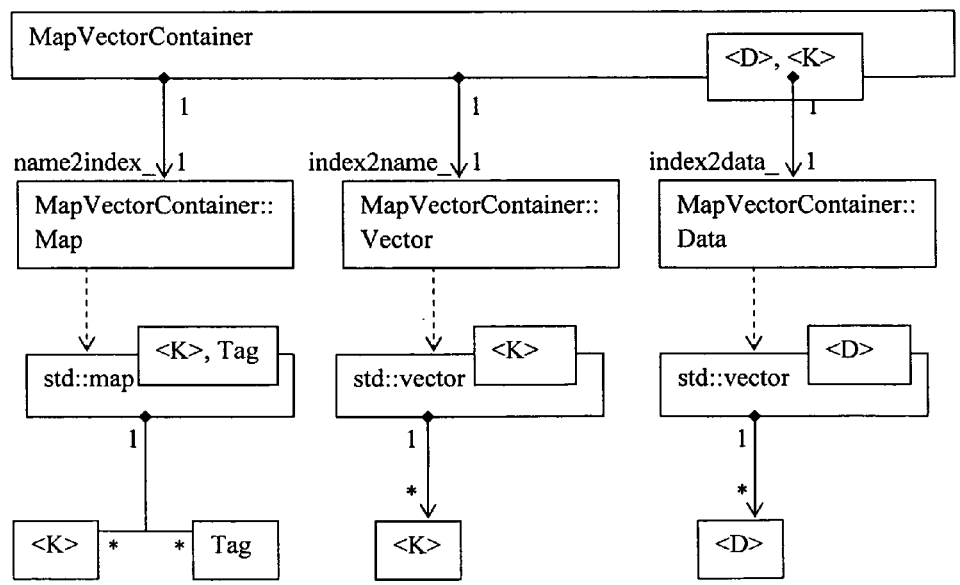
FIG. 9 shows a UML diagram of a compiler compiler runtime MapVectorContainer template class.

FIG. 9 shows a UML diagram of compiler compiler runtime MapVectorContainer template class. This template class is designed to support different SyntaxControlledRuntime containers that are defined as SyntaxControlledRuntime inner types instantiating MapVectorContainer template class with different SyntaxControlledRuntime inner classes. In many compilation tasks a sequence of objects must be identified by object name or sequentially by sequential number in accordance with objects definition.

Consider a definition like this:

int z, a, b, w;

If a compiler builds a map from a string representing object name to object instance, then it would be easy and efficient to manipulate those objects by finding them by name. However, the original order of z, a, b, w would disappear since in the map they are ordered differently. MapVectorContainer is designed to provide both effective operations by name and preserving original sequence in the way objects were originally defined having direct access by name (object key) and by index (object sequential number).

On FIG. 9 MapVectorContainer template class takes two formal arguments, <D> representing object type and <K> representing object key type. MapVectorContainer defines three inner types such as MapVectorContainer::Map, MapVectorContainer::Vector, and MapVectorContainer::Data. The MapVectorContainer::Map type is defined as std::map<K, Tag>. The MapVectorContainer::Vector Map type is defined as std::vector<K>. MapVectorContainer::Data type is defined as std::vector<D>. MapVectorContainer template class instantiates name2index_instance of type MapVector- Container::Map, index2name_instance of type MapVectorContainer::Vector, and index2data_instance of type MapVectorContainer::Data.

Figure 10:
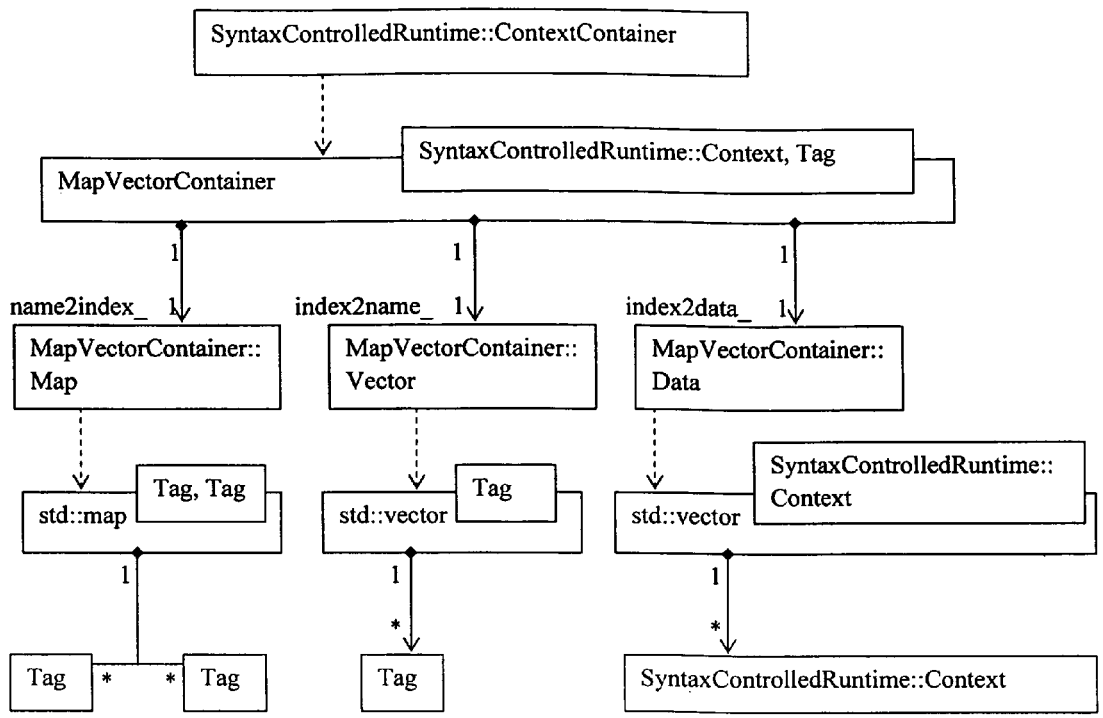
FIG. 10 shows a UML diagram of a compiler compiler runtime SyntaxControlledRuntime::ContextContainer inner class based on a MapVectorContainer template class.

FIG. 10 shows a UML diagram of compiler compiler runtime SyntaxControlledRuntime::ContextContainer inner class based on MapVectorContainer template class. SyntaxControlledRuntime::ContextContainer inner class is MapVectorContainer template class instance with arguments K=Tag and D=SyntaxControlledRuntime::Context.

Figure 11:
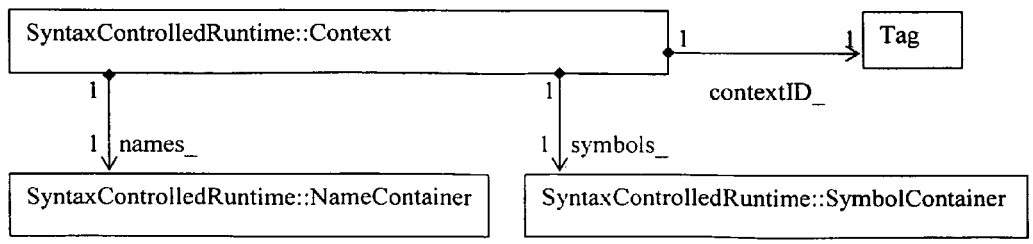
FIG. 11 shows a UML diagram of a compiler compiler runtime SyntaxControlledRuntime::Context inner class and its relationships with SyntaxControlledRuntime::NameContainer and SyntaxControlledRuntime::SymbolContainer inner classes.

FIG. 11 shows a UML diagram of compiler compiler runtime SyntaxControlledRuntime::Context inner class and its relationships with SyntaxControlledRuntime::NameContainer and SyntaxControlledRuntime::SymbolContainer inner classes. SyntaxControlledRuntime::Context has data members contextID_ of type Tag, names_ of type SyntaxControlledRuntime::NameContainer, and symbols_ of type SyntaxControlledRuntime::SymbolContainer.

Figure 12:
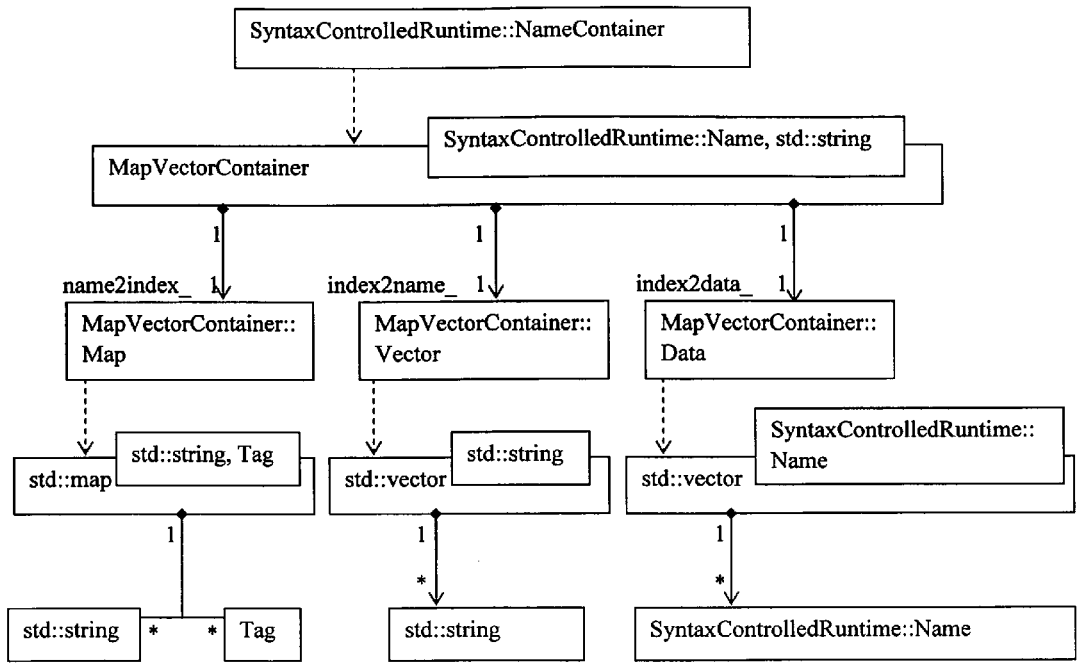
FIG. 12 shows a UML diagram of a compiler compiler runtime SyntaxControlledRuntime::NameContainer inner class based on a MapVectorContainer template class.

FIG. 12 shows a UML diagram of compiler compiler runtime SyntaxControlledRuntime::NameContainer inner class based on MapVectorContainer template class. SyntaxControlledRuntime:: NameContainer inner class is MapVectorContainer template class instance with arguments K=std::string and D=SyntaxControlledRuntime::Name.

Figure 13:
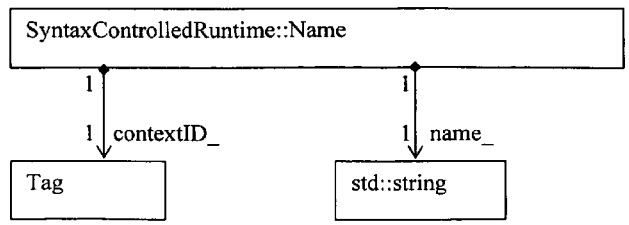
FIG. 13 shows a UML diagram of a compiler compiler runtime SyntaxControlledRuntime::Name inner class.

FIG. 13 shows a UML diagram of compiler compiler runtime SyntaxControlledRuntime::Name inner class having contextID_data member of type Tag and name_data member of type std::string.

Figure 14:
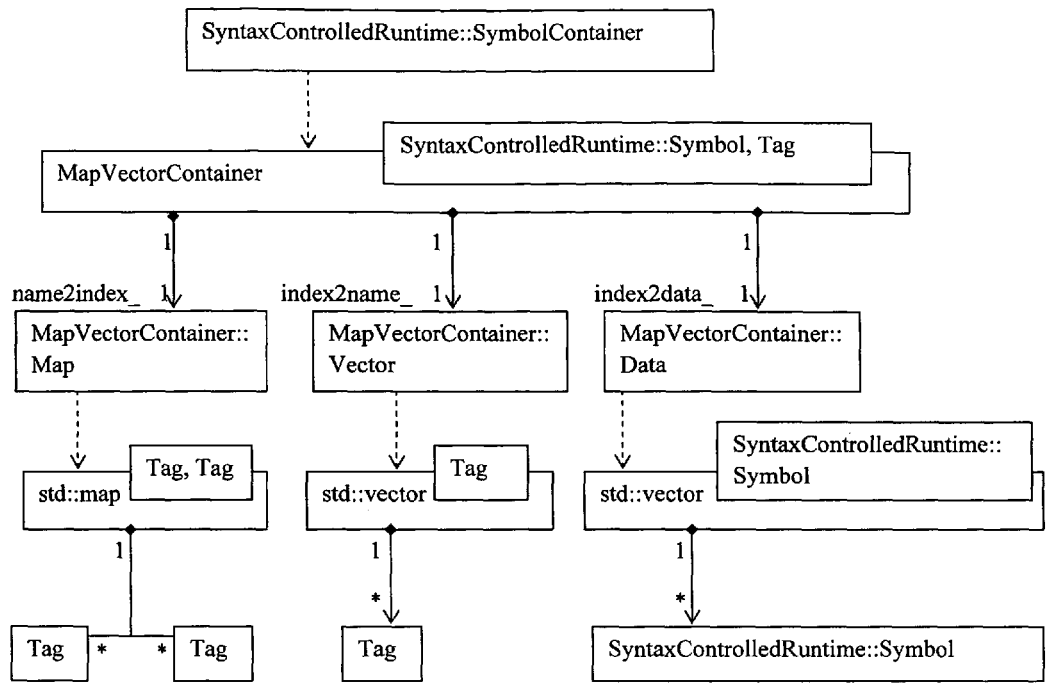
FIG. 14 shows a UML diagram of a compiler compiler runtime SyntaxControlledRuntime::SymbolContainer inner class based on a MapVectorContainer template class.

FIG. 14 shows a UML diagram of compiler compiler runtime SyntaxControlledRuntime::SymbolContainer inner class based on MapVectorContainer template class. SyntaxControlledRuntime::SymbolContainer inner class is MapVectorContainer template class instance with arguments K=Tag and D=SyntaxControlledRuntime::Symbol.

Figure 15:
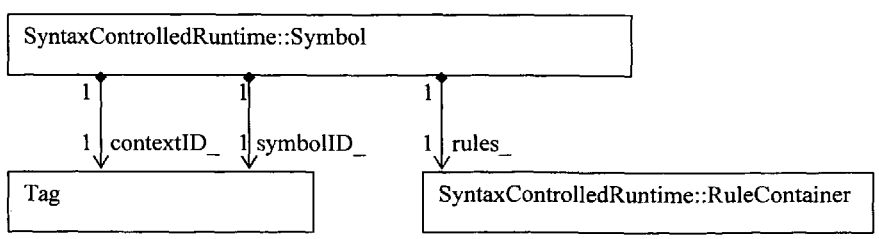
FIG. 15 shows a UML diagram of a compiler compiler runtime SyntaxControlledRuntime::Symbol inner class.

FIG. 15 shows a UML diagram of compiler compiler runtime SyntaxControlledRuntime::Symbol inner class having contextID_and symbolID_data members of type Tag and rules_data member of type SyntaxControlledRuntime:: RuleContainer.

Figure 16:
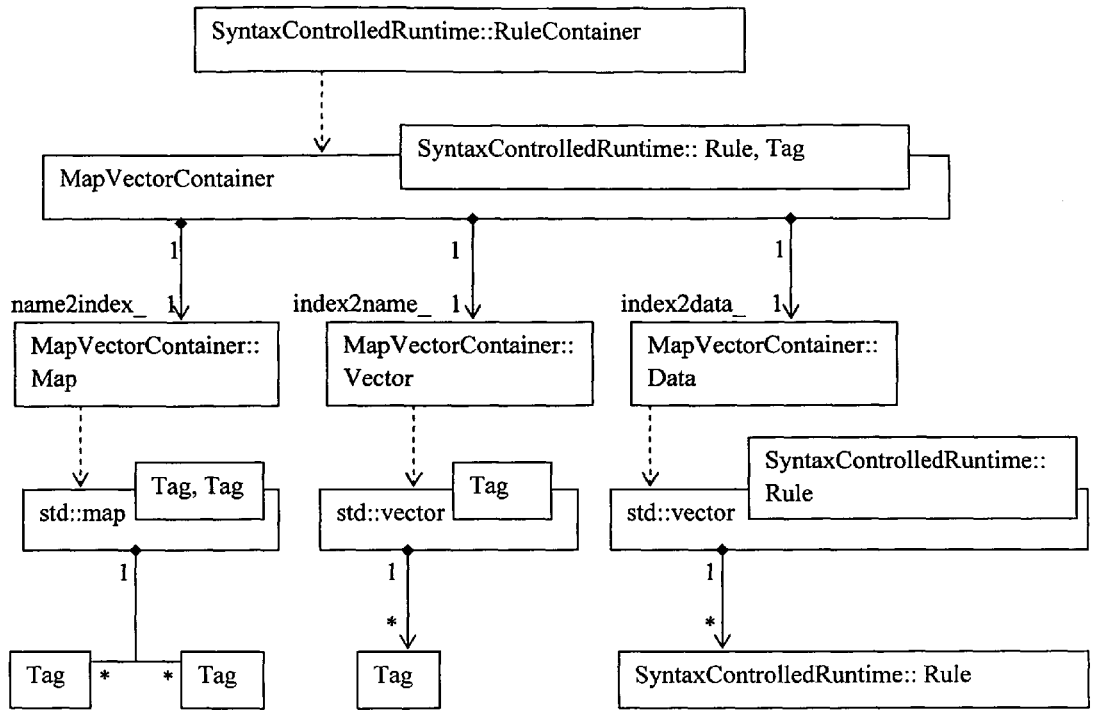
FIG. 16 shows a UML diagram of a compiler compiler runtime SyntaxControlledRuntime::RuleContainer inner class based on MapVectorContainer template class.

FIG. 16 shows a UML diagram of compiler compiler runtime SyntaxControlledRuntime::RuleContainer inner class based on MapVectorContainer template class. SyntaxControlledRuntime:: RuleContainer inner class is MapVectorContainer template class instance with arguments K=Tag and D=SyntaxControlledRuntime::Rule.

Figure 17:
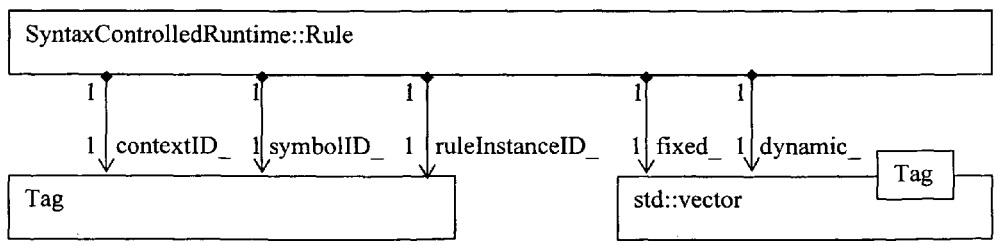
FIG. 17 shows a UML diagram of a compiler compiler runtime SyntaxControlledRuntime::Rule inner class.

FIG. 17 shows a UML diagram of compiler compiler runtime SyntaxControlledRuntime::Rule inner class class having contextID_, symbolID_, and ruleInstanceID_data members of type Tag and fixed_ and dynamic_data members of type std::vector<Tag>.

Figure 18:
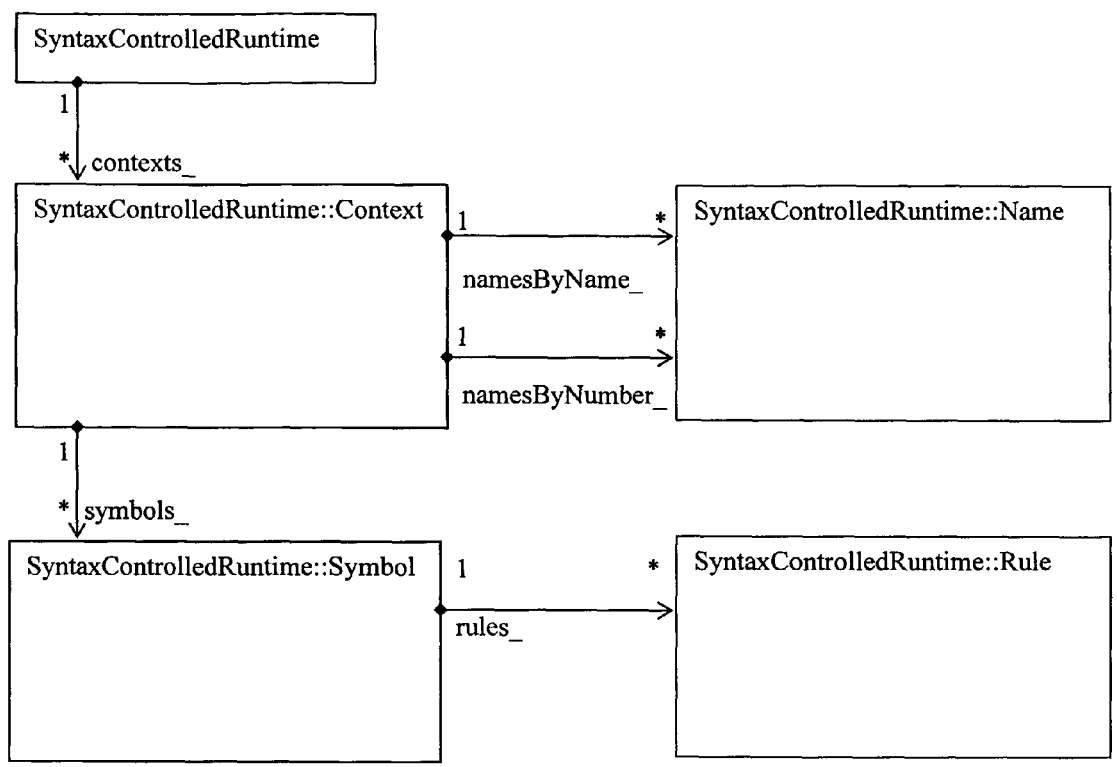
FIG. 18 shows a UML diagram of a compiler compiler runtime SyntaxControlledRuntime class and its inner classes with their relationships regardless of the implementation details of the containers.

FIG. 18 shows a UML diagram of compiler compiler runtime SyntaxControlledRuntime class and its inner classes with their relationships regardless containers implementation details. Actually FIG. 18 defines compiler compiler runtime logical view as a collection of individual context. Logically each compiler compiler runtime context maintains its own collection of names ordered alphabetically or by sequential number with direct access by name or sequential number.

Logically each compiler compiler runtime context maintains its own collection of symbols ordered by symbolID with direct access by symbolID.

Logically each compiler compiler runtime symbol maintains its own collection of rules representing each rule invocation during parsing for a given symbol.

Actually, compiler compiler runtime logical view and compiler compiler binary logical view are the same since compiler compiler runtime and compiler compiler binary are interchangeable. However, compiler compiler runtime is designed to be an effective environment for processing parsing results during parsing itself, and compiler compiler binary is designed to be an effective environment for processing final parsing results in read only mode serving as a multiplatform interchange format.

In other words, FIG. 18 shows one form of compiler compiler parsing model with entities such as Context, Name, Symbol, and Rule with their relationships.

As described in the following paragraphs with reference to FIGS. 19-26, the compiler compiler binary syntax-controlled API, including various inner classes, is designed to perform the following set of operations to be invoked from any application responsible for any semantics processing based on compiler compiler system:

Get const pointer to 'SyntaxControlledBinary::Context::BinaryHeader'.

Get pointer to 'SyntaxControlledBinary::Context::BinaryHeader'.

Get identifier as a const char* having its sequential number.

Get identifier as a const char* having its alphabetic number.

Get identifier sequential number having its alphabetic number.

Get pointer to 'SyntaxControlledBinary::Context::BinarySymbol' having symbol sequential number.

Get pointer to 'SyntaxControlledBinary::Context::BinarySymbol' having 'SymbolID'.

Get pointer to char having offset in 'memory_' data member.

Get const pointer to char having offset in 'memory_' data member.

Return aligned size of anything to 'Tag' size with given initial size.

Get pointer to 'SyntaxControlledBinary::Context::BinaryRule' having 'SyntaxControlledBinary::Context:: BinarySymbol' instance pointer and rule instance number given for that symbol.

Populate 'SyntaxControlledBinary::Context::BinaryRuleContent' by its reference having 'SyntaxControlledBinary:: Context:: BinarySymbol' instance pointer and 'SyntaxControlledBinary::Context::BinaryRule' instance pointer.

Get rule fixed part as a pointer to 'Tag' having 'SyntaxControlledBinary::Context::BinaryRule' instance pointer.

Get rule fixed part as a reference to 'TypeInstance' having 'SyntaxControlledBinary::Context::BinaryRule' instance pointer and rule instance number.

Get rule dynamic part as a pointer to 'Tag' having 'SyntaxControlledBinary::Context::BinaryRule' instance pointer.

Get rule dynamic part as a reference to 'TypeInstance' having 'SyntaxControlledBinary::Context::BinaryRule' instance pointer and rule instance number.

Write binary into file having file name.

Read binary from file having file name.

Figure 19:
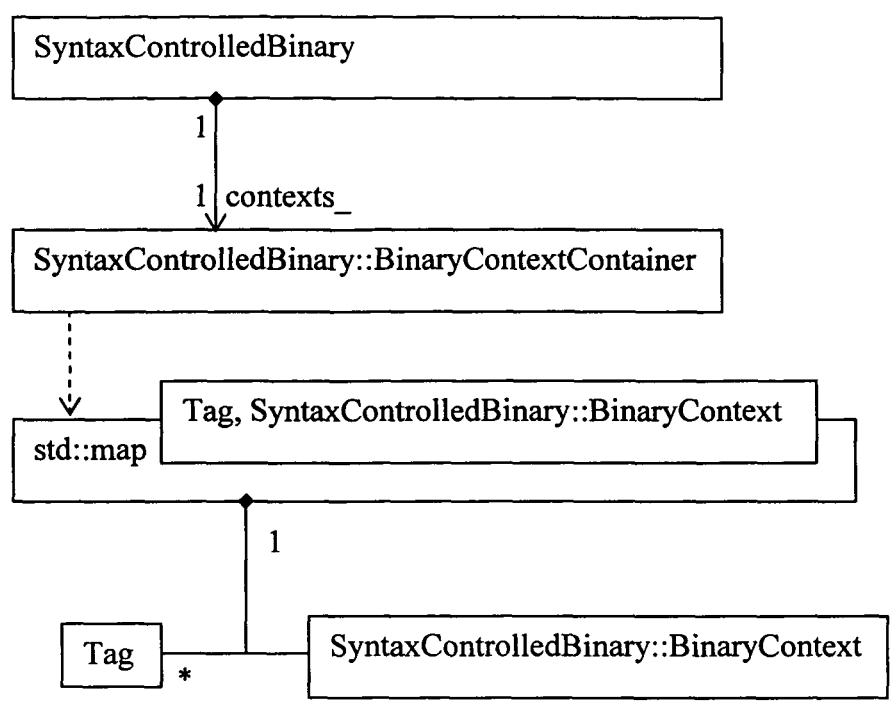
FIG. 19 shows a UML diagram of compiler compiler binary SyntaxControlledBinary class and its inner classes with their relationships.

FIG. 19 shows a UML diagram of a compiler compiler binary SyntaxControlledBinary class and its inner classes with their relationships. SyntaxControlledBinary class has contexts_ of type SyntaxControlledBinary::BinaryContextContainer, i.e., SyntaxControlledBinary is a collection of individual binary contexts each of them is represented by inner class SyntaxControlledBinary::BinaryContext. SyntaxControlledBinary::BinaryContextContainer is defined as std::map from Tag to SyntaxControlledBinary::BinaryContext.

Figure 20:
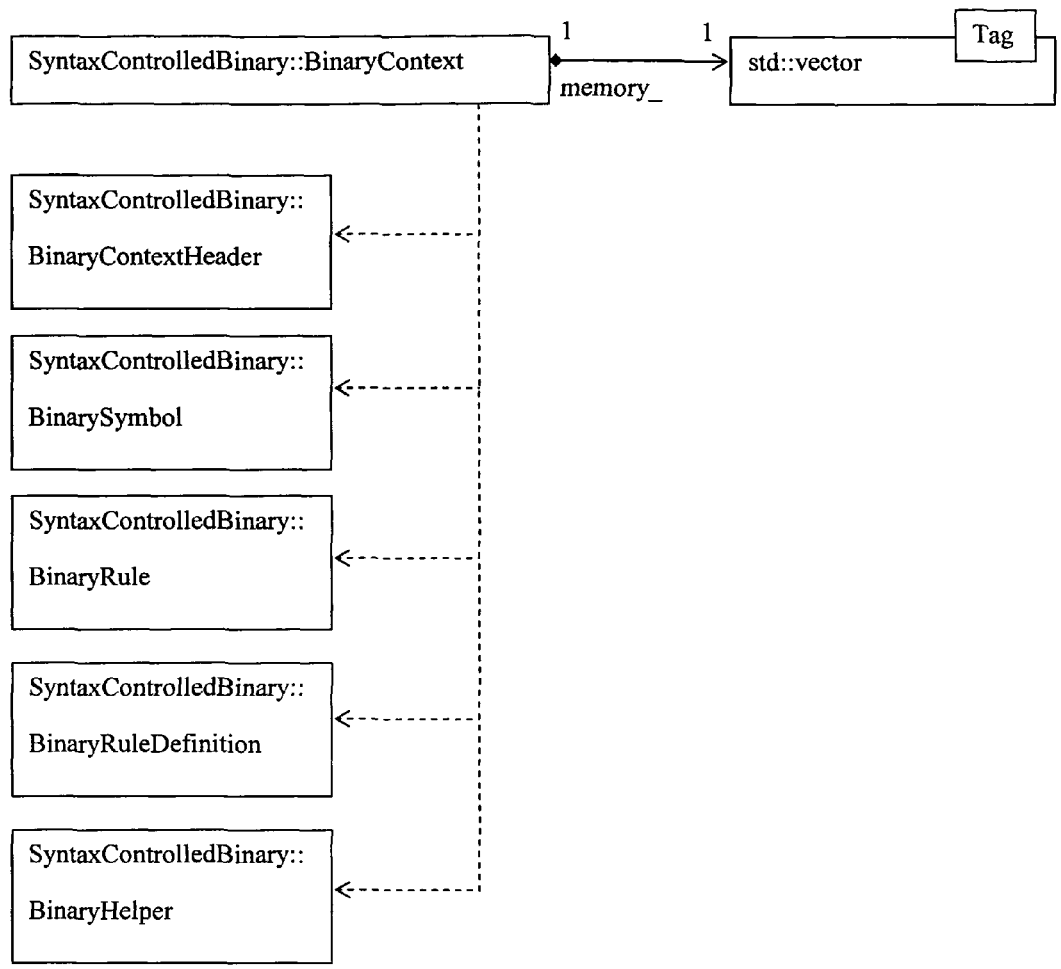
FIG. 20 shows a UML diagram of a compiler compiler binary SyntaxControlledBinary::BinaryContext class and other SyntaxControlledBinary inner classes with their relationships.

FIG. 20 shows a UML diagram of compiler compiler binary SyntaxControlledBinary::BinaryContext class and other SyntaxControlled Binary inner classes with their relationships. SyntaxControlledBinary::BinaryContext class has only one data member, memory_ that is of type std::vector<Tag> meaning that SyntaxControlledBinary::BinaryContext is represented as a raw memory where SyntaxControlledBinary::BinaryContextHeader, SyntaxControlledBinary::BinarySymbol, SyntaxControlledBinary::BinaryRule class instances are actually allocated.

SyntaxControlledBinary shown in FIG. 19 can be converted into a single binary object specified by the following Backus-Naur Form (BNF):

(1) SyntaxControlledBinary::=header catalog elements
(2) header::=headerSize headerTotal headerCatalogOffset headerElementsOffset
(3) headerSize::=integerToken
(4) headerTotal::=integerToken
(5) headerCatalogOffset::=integerToken
(6) headerElementsOffset::=integerToken
(7) catalog::={catalogElement}
(8) catalogElement::=catalogElementContextID catalogElementOffset catalogElementSize
(9) catalogElementContextID::=integerToken
(10) catalogElementOffset::=integerToken
(11) catalogElementSize::=integerToken
(12) elements::=SyntaxControlledBinaryContext)
(13) SyntaxControlledBinaryContext::=
  BinaryContextHeader
  BinaryContextSequentialNames
  BinaryContextAlphabeticalNames
  BinaryContextNames
  BinaryContextSymbols
  BinaryContextRules
  BinaryContextRuleElements
(13.1) BinaryContextHeader::=
  BinaryContextHeaderLength
  BinaryContextHeaderCurrent
  BinaryContextHeaderAxiom
  BinaryContextHeaderNumberOfIdentifiers
  BinaryContextHeaderStartOfIdentifiersMap
  BinaryContextHeaderNumberOfSymbol
  BinaryContextHeaderStartOfSymbols
(13.1.1) BinaryContextHeaderLength::=integerToken
(13.1.2) BinaryContextHeaderCurrent::=integerToken
(13.1.3) BinaryContextHeaderAxiom::=integerToken
(13.1.4) BinaryContextHeaderNumberOfIdentifiers::=integerToken
(13.1.5) BinaryContextHeaderStartOfIdentifiersMap::=integerToken
(13.1.6) BinaryContextHeaderNumberOfSymbol::=integerToken
(13.1.7) BinaryContextHeaderStartOfSymbols::=integerToken
(13.2) BinaryContextSequentialNames::={BinaryContextSequentionalNameOffset}
(13.2.1) BinaryContextSequentionalNameOffset::=integerToken
(13.3) BinaryContextAlphabeticalNames::=BinaryContextAlphabeticalName)
(13.3.1) BinaryContextAlphabeticalName::=
  BinaryContextAlphabeticalNameOffset
  BinaryContextAlphabeticalNameID
(13.3.1.1) BinaryContextAlphabeticalNameOffset::=integerToken
(13.3.1.2) BinaryContextAlphabeticalNameID::=integerToken
(13.4) BinaryContextNames::=BinaryContextNameAligned
(13.4.1) BinaryContextNameAligned::=stringToken
(13.5) BinaryContextSymbols::=BinaryContextSymbol
(13.5.1) BinaryContextSymbol::=
  BinaryContextSymbolNumberOfRuleInstances
  BinaryContextSymbolID
  BinaryContextSymbolStart
(13.5.1.1) BinaryContextSymbolNumberOfRuleInstances::= integerToken
(13.5.1.2) BinaryContextSymbolID::=integerToken
(13.5.1.3) BinaryContextSymbolStart::=integerToken
(13.6) BinaryContextRules::={BinaryContextRule}
(13.6.1) BinaryContextRule::=
  BinaryContextRuleFixed
  BinaryContextRuleDynamic
  BinaryContextRuleStart
(13.6.1.1) BinaryContextRuleFixed::=integerToken
(13.6.1.2) BinaryContextRuleDynamic::=integerToken
(13.6.1.3) BinaryContextRuleStart::=integerToken
(13.7) BinaryContextRuleElements::={BinaryContextRuleElement}
(13.7.1) BinaryContextRuleElement::=
  BinaryContextRuleElementFixed\BinaryContextRuleElementDynamic
(13.7.1.1) BinaryContextRuleElementFixed::=integerToken
(13.7.1.2) BinaryContextRuleElementDynamic::=integerToken where memory_data member of SyntaxControlledBinary::BinaryContext class is represented by rule (13) SyntaxControlledBinaryContext.

Figure 21:
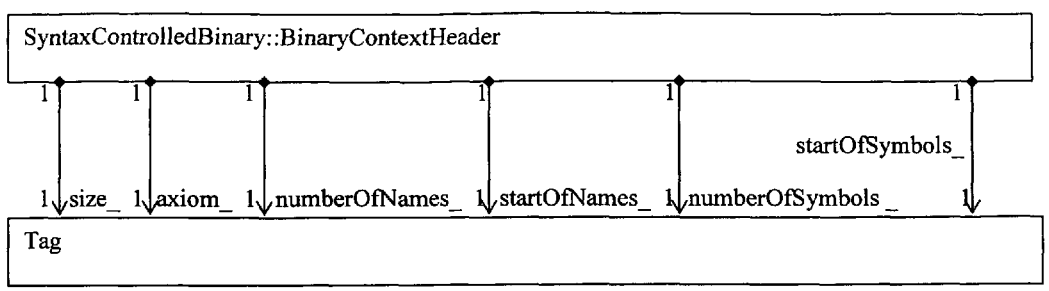
FIG. 21 shows a UML diagram of a compiler compiler binary SyntaxControlledBinary::BinaryContextHeader class.

Note, that this BNF is extended by special extensions such as iteration when some non-terminal is enclosed with '{' and '}' meaning that that non-terminal can occur zero or unlimited number of times; alternative when some non-terminals are separated by '|' meaning that one of them can occur; 'integerToken' is used to represent 4 bytes integer or 8 bytes integer; 'stringToken' is used to represent string literal properly aligned. So, BinaryContextRuleElements::={BinaryContextRuleElement} is equivalent to
BinaryContextRuleElements::=BinaryContextRuleElement BinaryContextRuleElements BinaryContextRuleElements::=
So,
BinaryContextRuleElement::=
  BinaryContextRuleElementFixed\BinaryContextRuleElementDynamic
is equivalent to
BinaryContextRuleElement::=BinaryContextRuleElementFixed
BinaryContextRuleElement::=BinaryContextRuleElementDynamic FIG. 21 shows a UML diagram of compiler compiler binary SyntaxControlledBinary::BinaryContextHeader class. It is a struct that has the following fields of type Tag: size_, axiom_, numberOfNames_, startOfNames_, numberOfSymbols_, and startOfSymbols_. The instance of this struct is actually allocated inside SyntaxControlledBinary::BinaryContext memory_data member.

Figure 22:
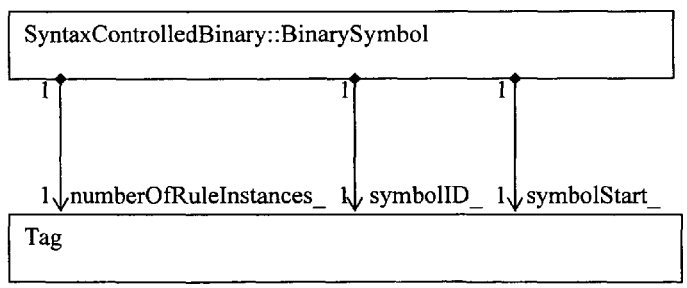
FIG. 22 shows a UML diagram of a compiler compiler binary SyntaxControlledBinary::BinarySymbol class.

FIG. 22 shows a UML diagram of compiler compiler binary SyntaxControlledBinary::BinarySymbol class. It is a struct that has the following fields of type Tag: numberOfRuleInstances_, symbolID_, and symbolStart_. The instances of this struct are actually allocated inside SyntaxControlledBinary::BinaryContext memory_ data member.

Figure 23:
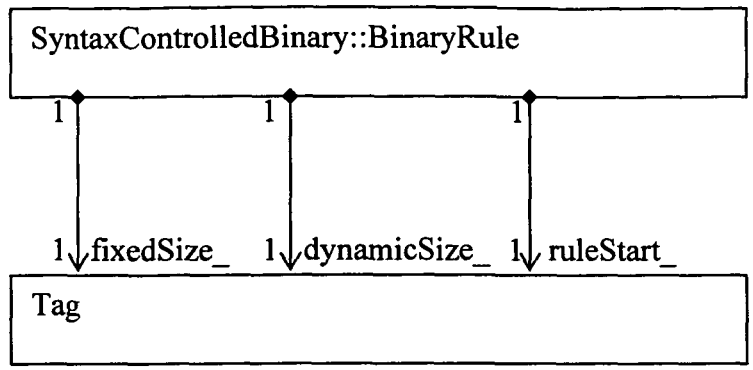
FIG. 23 shows a UML diagram of a compiler compiler binary SyntaxControlledBinary::BinaryRule class.

FIG. 23 shows a UML diagram of compiler compiler binary SyntaxControlledBinary::BinaryRule class. It is a struct that has the following fields of type Tag: fixedSize_, dynamicSize_, and ruleStart_. The instances of this struct are actually allocated inside SyntaxControlledBinary::BinaryContext memory_data member.

Figure 24:
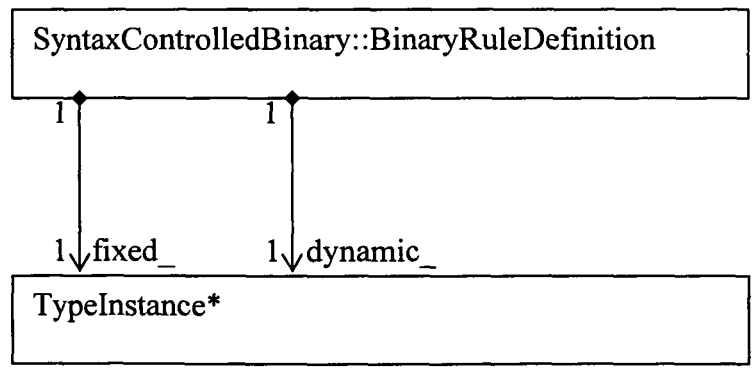
FIG. 24 shows a UML diagram of a compiler compiler binary SyntaxControlledBinary::BinaryRuleDefinition class.

FIG. 24 shows a UML diagram of compiler compiler binary SyntaxControlledBinary::BinaryRuleDefinition class. It is a struct that has the following fields of type TypeInstance*, pointer to TypeInstance: fixed_ and dynamic_. This struct is an auxiliary type that is not actually allocated inside SyntaxControlledBinary::BinaryContext memory_data member, it has two pointers fixed_ and dynamic_ for fixed and dynamic rule parts actually allocated inside SyntaxControlledBinary::BinaryContext memory_data member.

Figure 25:
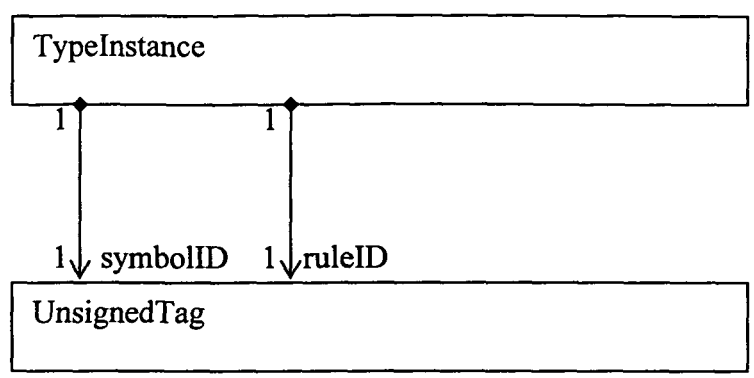
FIG. 25 shows a UML diagram of a compiler compiler management TypeInstance class.

FIG. 25 shows a UML diagram of compiler compiler management TypeInstance class. The description of FIG. 7 also has a definition of TypeInstance class. Its fields symbolID_ and ruleID_ are actually packed fields that form 4- or 8-byte word depending on the computer architecture.

Figure 26:
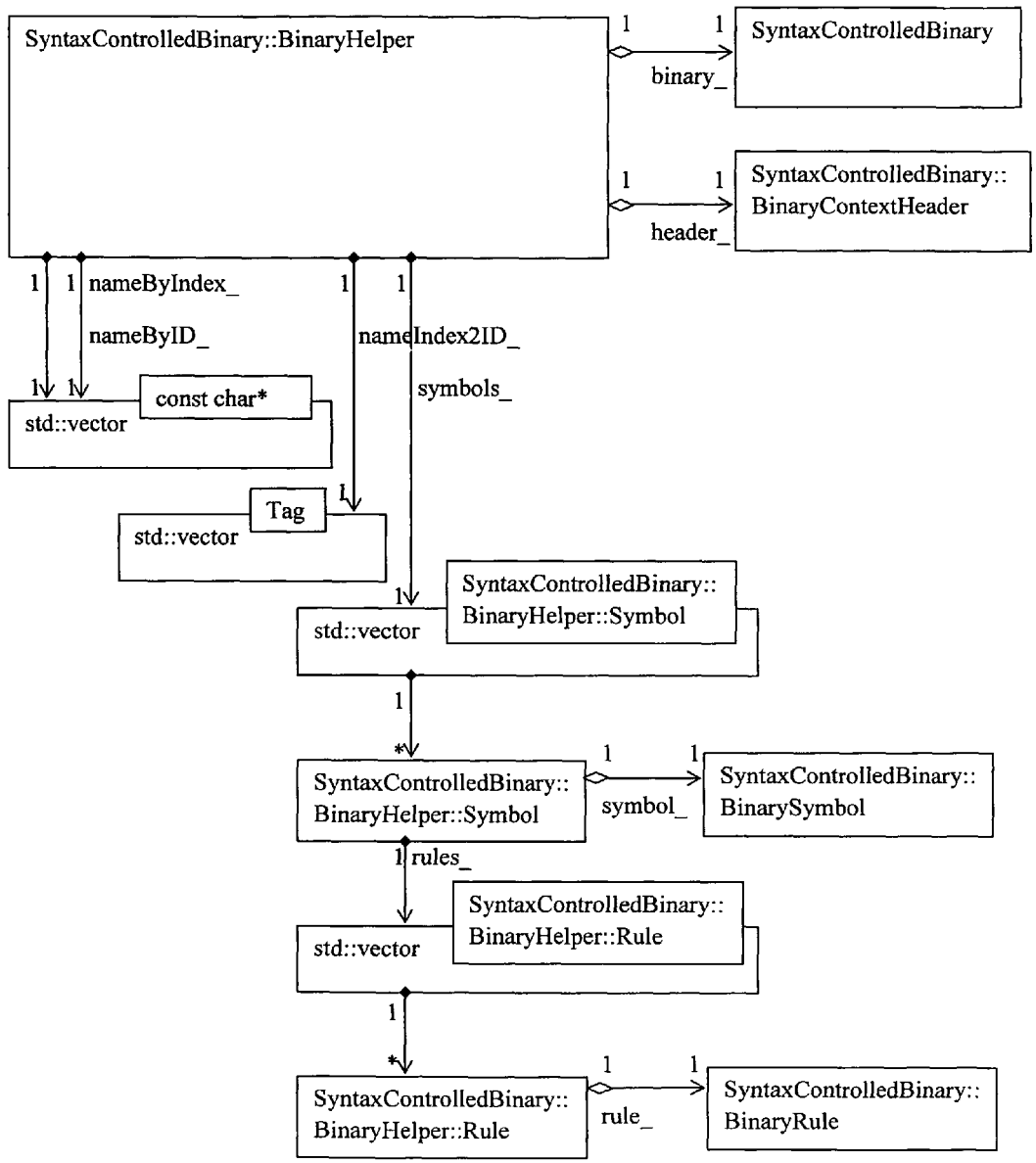
FIG. 26 shows a UML diagram of a compiler compiler binary SyntaxControlledBinary::BinaryHelper class.

FIG. 26 shows a UML diagram of compiler compiler binary SyntaxControlledBinary::BinaryHelper class. This class is an auxiliary type that is not actually allocated inside SyntaxControlledBinary::BinaryContext memory_data member. This class implements SyntaxControlledBinary logical view similar to FIG. 18. SyntaxControlledBinary::BinaryHelper class has references to SyntaxControlledBinary and SyntaxControlledBinary::BinaryContextHeader, binary_ and header_ respectively. Also it has data members nameByIndex_ and nameByID_ of type std::vector<const char*>, nameIndex2ID_ of type std::vector<Tag>, symbols_ of type std::vector<SyntaxControlledBinary::BinaryHelper:Symbol>. The nameByIndex_ represents all context names ordered sequentially. The nameByID_ represents all context names ordered alphabetically. The nameIndex2ID_ represents mapping from alphabetic order to sequential order. The symbols_ represents a vector container of all context symbols with individual elements of type SyntaxControlledBinary::BinaryHelper::Symbol. The SyntaxControlledBinary::BinaryHelper::Symbol has a pointer reference to SyntaxControlledBinary::BinarySymbol instance as symbol_ member, data member rules_ of type std::vector<SyntaxControlledBinary::BinaryHelper:Rule>. The SyntaxControlledBinary::BinaryHelper::Rule has a pointer reference to SyntaxControlledBinary::BinaryRule instance as rule_ member.

Figure 27:
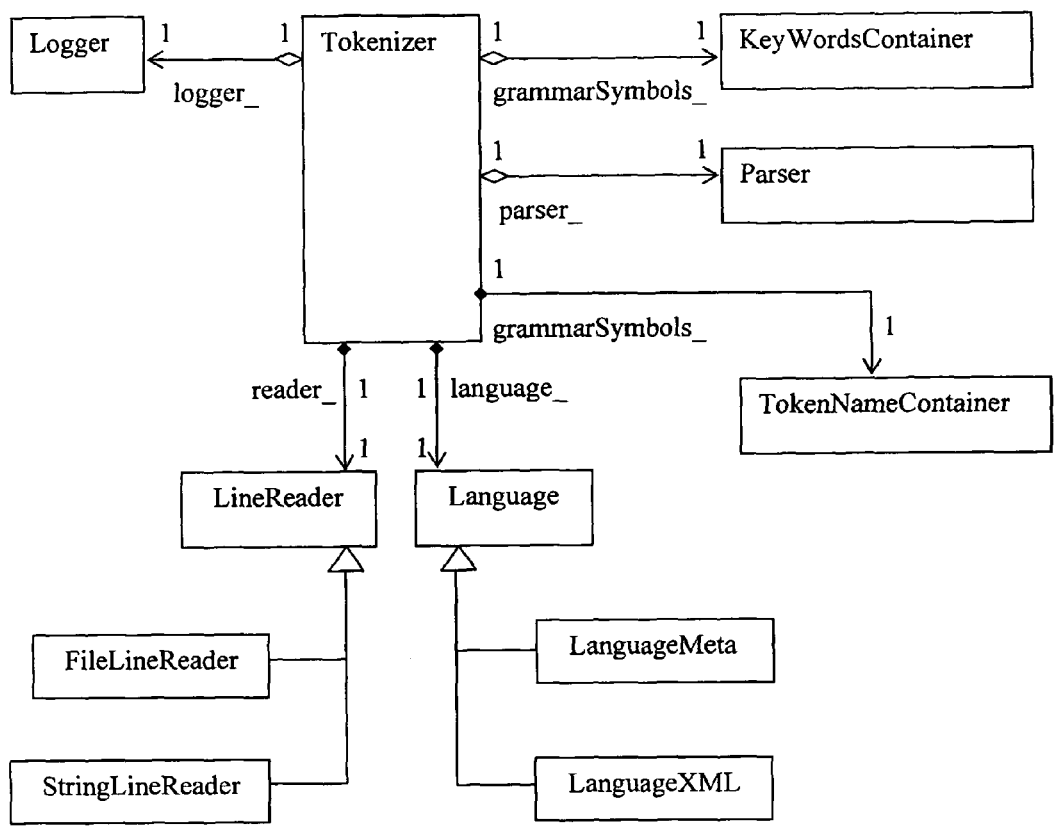
FIG. 27 shows a UML diagram of a compiler compiler management Tokenizer class and its relationships with LineReader, Language, and TokenNameContainer classes.

FIG. 27 shows a UML diagram of compiler compiler management Tokenizer class and its relationships with LineReader, Language, and TokenNameContainer classes. The Tokenizer class has references logger_ to Logger, grammarSymbols_ to KeyWordsContainer, and parser_ to Parser. The Tokenizer class instantiates an instance of TokenNameContainer as grammarSymbols_member. The Tokenizer class instantiates LineReader as reader_ and Language as language_.

The LineReader class is an abstract base class. The FileLineReader and StringLineReader classes are derived from LineReader. The FileLineReader class provides implementation for reading source text of compiled program from a file, it also maintains the corresponding listing as a file. The StringLineReader class provides implementation for reading source text of compiled program from a std::string as a sequence of lines separated by a given delimiter, it also maintains the corresponding listing. Any other line reader classes can be implemented as derived from LineReader abstract base class.

The LineReader class comprises the following pure virtual functions or their equivalents:
'get' returning argument by reference, the next line as a string to be processed by 'Tokenize'.

'put' having const reference to string to be put into listing by 'Tokenizer'.
boolean 'hasListing' returning true if listing is maintained.
boolean 'isEof' indicating end of source lines to be processed.
'start' having file name and listing file name.
'start' having const reference to string to be processed as a sequence of lines and boolean flag if listing is required.

The Language class is an abstract base class. The LanguageMeta and LanguageXML classes are derived from the Language class. The LanguageMeta class implements tokens set and Language interface for compiler compiler source grammar definition language. The LanguageXML class implements tokens set and Language interface for XML type of languages.

Figure 28:
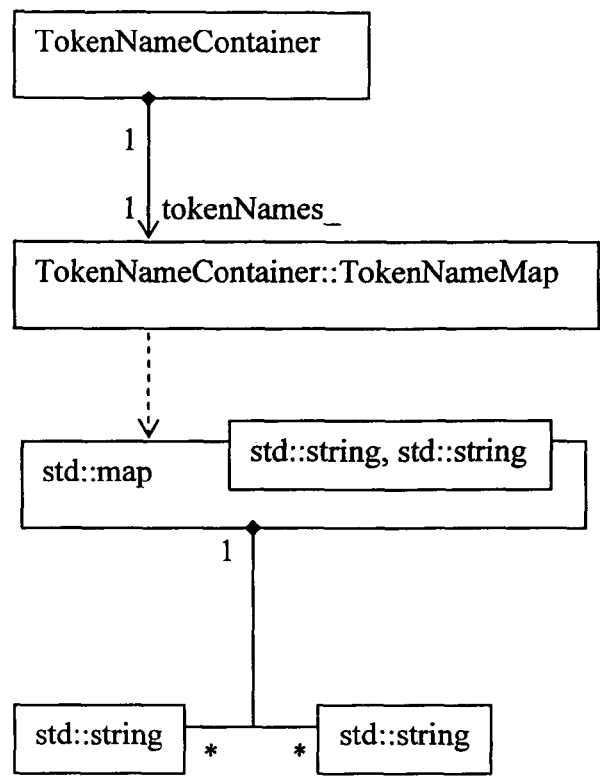
FIG. 28 shows a UML diagram of a compiler compiler management TokenNameContainer class.

FIG. 28 shows a UML diagram of compiler compiler management TokenNameContainer class. It has a data member tokenNames_ of type TokenNameContainer::TokenNameMap defined as std::map<std::string, std::string>.

Figure 29:
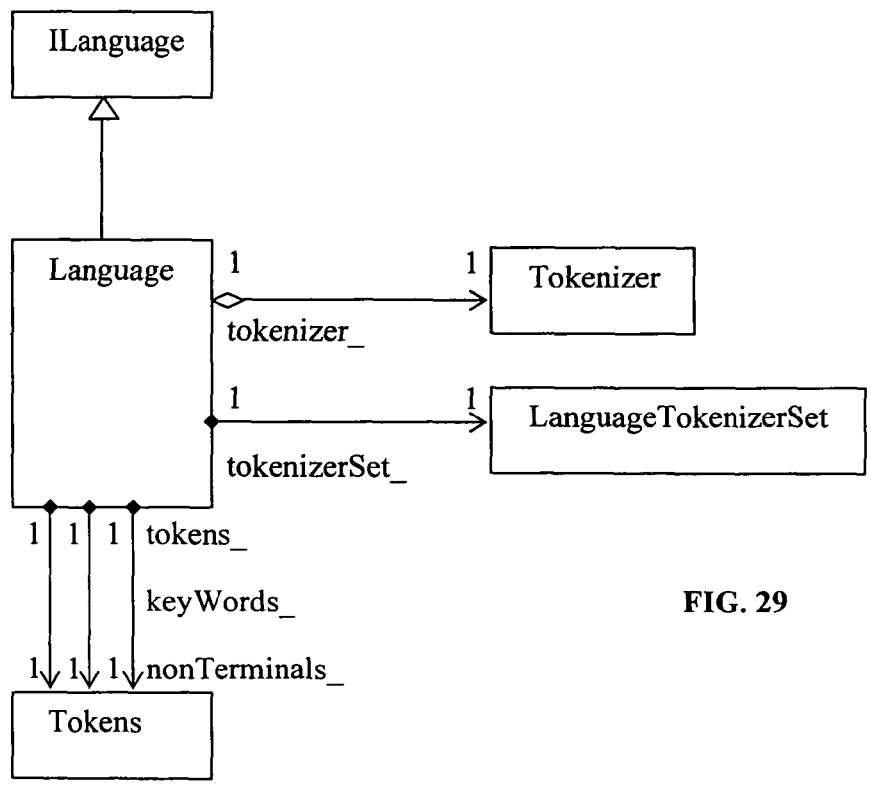
FIG. 29 shows a UML diagram of a compiler compiler management Language class and its relationships with related classes.

FIG. 29 shows a UML diagram of compiler compiler management Language class and its relationships with related classes. The Language is an abstract base class derived from abstract base class ILanguage that consists of a set of pure virtual functions defining its interface. The Language class has a reference tokenizes to Tokenizer class. The Language class has a data member tokenizerSet_ of enumeration (a.k.a. enum) type LanguageTokenizerSet. The Language class instantiates three instances such as tokens_, keyWords_, and nonTerminals_ of type Tokens.

The 'Language' abstract class comprises the following pure virtual functions or their equivalents from the set of functions defining the ILanguage interface:
'getCharacter' populating 'Tokenizer' 'currentCharacter'.
'getIdentifier' populating 'Tokenizer' 'currentIdentifier' and 'currentKeyWord'.
'getNumeric' populating 'Tokenizer' 'currentDoubleValue' or 'currentIntegerValue' depending on token value, and 'Tokenizer' 'currentKeyWord'.
'getString' populating 'Tokenizer' 'currentStringValue' and 'currentKeyWord'.
'getNextToken' populating 'Tokenizer' next token and 'currentKeyWord'.

In addition, the 'Language' class comprises generic functions common to all languages as derived classes from the 'Language' class; those generic functions are:
'populateTerminals' populating 'SymbolID' for each token defined in 'terminalTokens_', 'terminalKeyWords_', and 'nonTerminals_'.
'isDefinedToken' returning true or false depending on check of all tokens defined in 'terminalTokens_' if that token matches the sequence of characters starting from 'Tokenizer' 'currentCharacter'.
'isKeyWord' returning true or false depending on check if a given formal parameter is defined in corresponding name to index container of 'terminalKeyWords_'.
'setNextToken' setting 'Tokenizer' 'currentKeyWord' by performing loop for each token size 'k' starting from maximum size while 'k' greater than zero reducing 'k' by one by performing loop for each token 't' in 'terminalTokens_' checking if 'k' equals to token 't' size and token 't' is Token predicate is true then executing token 't' 'flushToken' function (see description of the Token class below); setting 'Tokenizer' 'currentKeyWord' as token 't' 'SymbolID'.
'getToken' having a formal argument as an input with token 'SymbolID' returning corresponding reference to 'Token' class instance.
'skipToken' having a first formal argument as an input with token 'SymbolID' and a second formal argument as an output with token reference to 'Tag' actually mapped to 'TypeInstance' class instance with token 'SymbolID' and token 'RuleID'; performing call to 'getToken' with the first formal argument as an input with token 'SymbolID' getting reference 't' to 'Token' class instance; performing call to method 'skipToken' with the first formal argument as an input with token 'SymbolID' and the second formal argument as an output with token reference to 'Tag'; performing call to 'getNextToken'.

'getTerminalString' setting 'Tokenizer' 'currentTerminalStringValue' and related 'Tokenizer' data members processing sequence of input characters enclosed with single quotes representing language defined terminal as a sequence of characters enclosed with single quotes.

Figure 30:
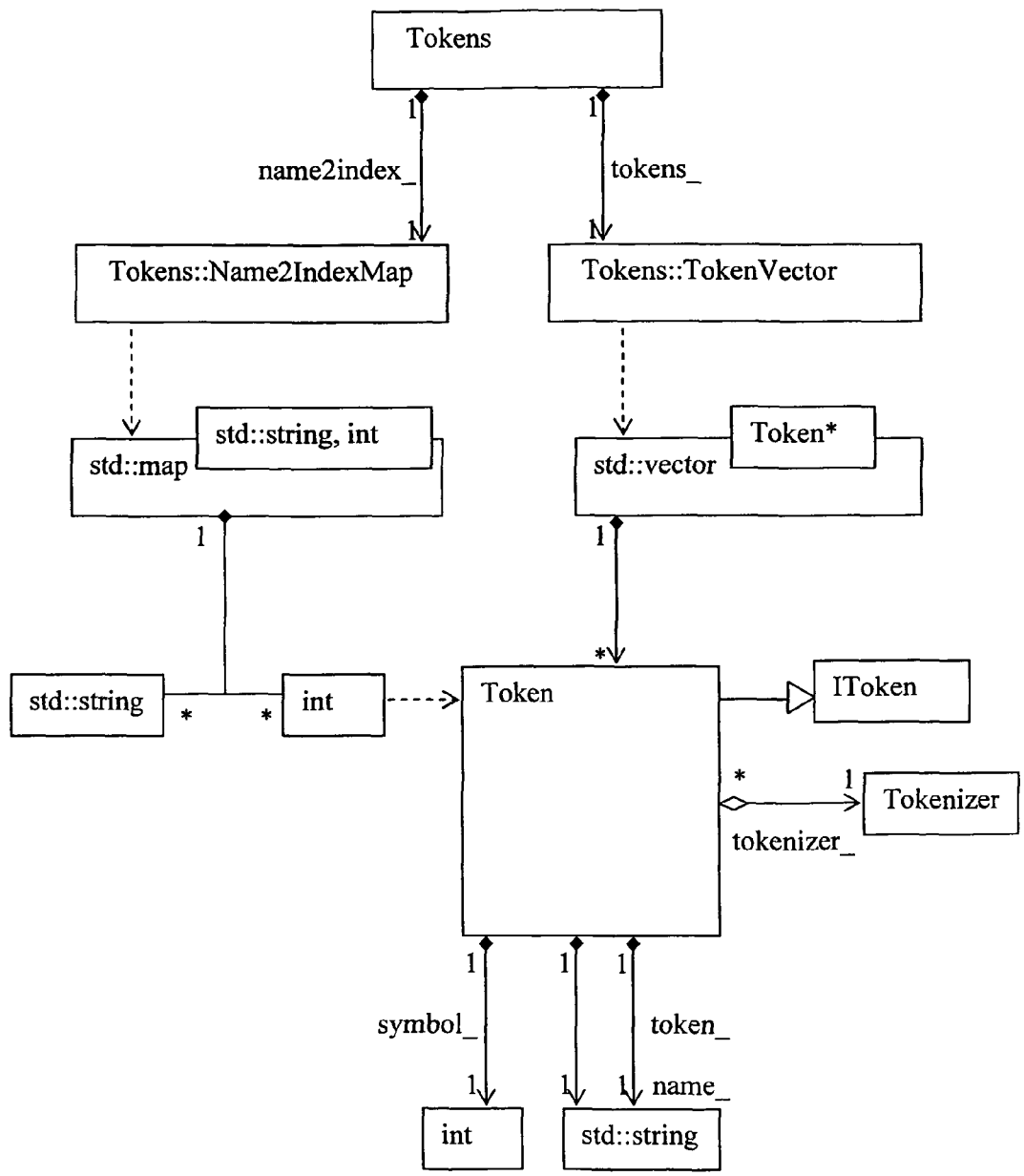
FIG. 30 shows a UML diagram of a compiler compiler management Tokens class and its relationships with related classes.

FIG. 30 shows a UML diagram of compiler compiler management Tokens class and its relationships with related classes. The Tokens class has data members name2index_ of type Tokens::Name2IndexMap and tokens_ of type Tokens::TokenVector. The type Tokens::Name2IndexMap is defined as std::map<std::string, int> mapping token name to token index for getting access to Token in tokens_container. The type Tokens::TokenVector is defined as std::vector<Token*> and it will be replaced by std::vector<std::shared_ptr<Token>> when std::shared_ptr will be widely available as C++ standard library class.

The Token class is an abstract base class that is derived from abstract base class IToken that consists of a set of pure virtual functions defining its interface. The Token class has a reference tokenizer_ to Tokenizer class instance. The Token class has a data member symbol_ that is actually corresponds to SymbolID of Symbol related to the given Token. The Token class has data members token_ and name_ of std::string type.

The 'Token' class comprises pure virtual functions or their equivalents from the set of pure virtual functions defining the IToken interface, such as:

'isToken' predicate returning true or false depending on if 'Tokenizer' sequence of characters starting from 'Tokenizer' 'currentCharacter' matches given token 'token_' data member.

'flushToken' checking if 'isToken' predicate returns true, then advancing 'Tokenizer' 'currentCharacter' to the next one beyond the given token sequence of characters; and executing 'Tokenizer' 'flushBlanks' function skipping white space characters such as blank, tabulation, etc.

Figure 31:
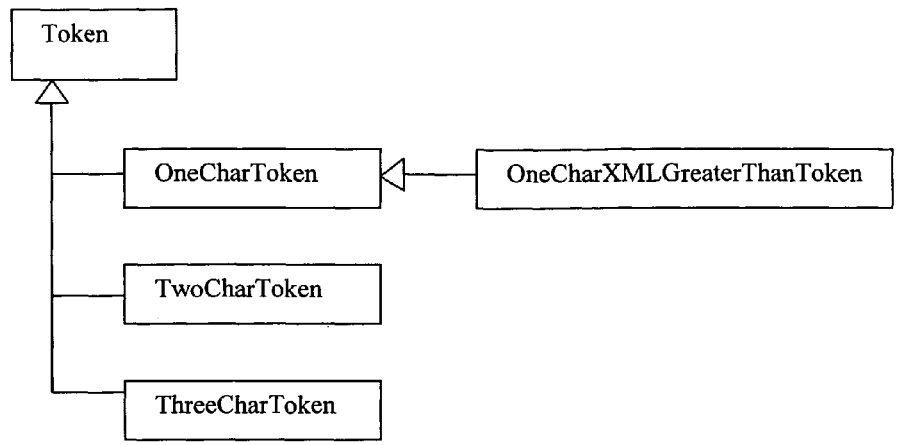
FIG. 31 shows a UML diagram of a compiler compiler management Token class hierarchy.

FIG. 31 shows a UML diagram of compiler compiler management Token class hierarchy. The OneCharToken, TwoCharToken, ThreeCharToken are derived from Token class abstract class implementing its interface. The OneCharXMLGreaterThanToken is derived from OneCharToken providing custom implementation of '>' token in case of XML type of languages.

Figure 32:
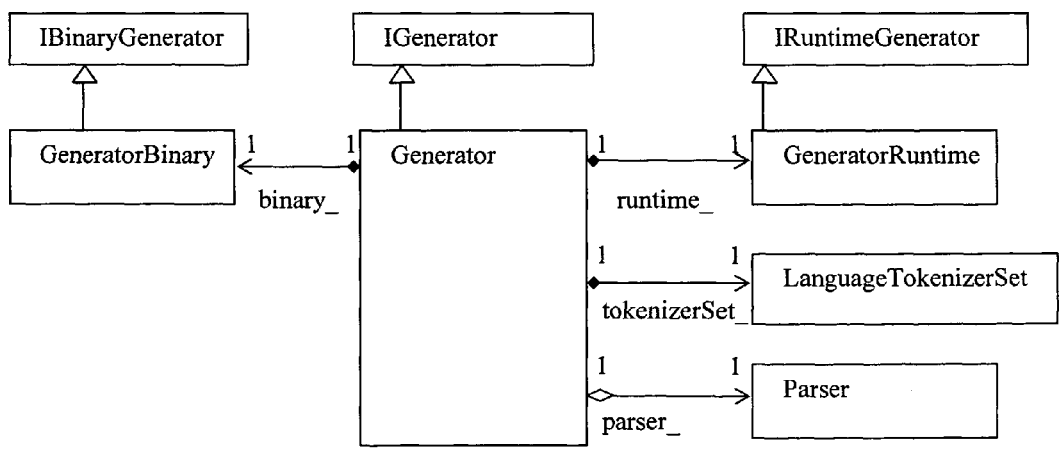
FIG. 32 shows a UML diagram of a compiler compiler generator Generator class and its relationships with related classes.

FIG. 32 shows a UML diagram of compiler compiler generator Generator class and its relationships with related classes. The Generator class is derived from IGenerator abstract base class that consists of a set of pure virtual functions or their equivalents defining its interface, such as:

'decompileRuntime' having file name as a formal argument where runtime content is de-compiled.

'decompileBinary' having file name as a formal argument where binary content is de-compiled.

'generateFromRuntime' having file name as a formal argument that is used to generate output based on runtime content.

'generateFromBinary' having file name as a formal argument that is used to generate output based on binary content.

The Generator class implements IGenerator interface; i.e., implements the foregoing functions or their equivalents. The Generator class has a reference parser_ to the Parser instance.

The Generator class has a data member tokenizerSet_ of enumerated type LanguageTokenizerSet. The Generator class instantiates runtime_ as GeneratorRuntime* and binary_ as GeneratorBinary*. Pointer to GeneratorRuntime, GeneratorRuntime*, and Pointer to GeneratorBinary, GeneratorBinary*, will be replaced by std::shared_ptr<GeneratorRuntime> and std::shared_ptr<GeneratorBinary> when std::shared_ptr will be widely available as C++ standard library class. The GeneratorBinary class is a base class derived from IBinaryGenerator abstract base class that consists of a set of pure virtual functions defining its interface. The GeneratorRuntime class is a base class derived from IRuntimeGenerator abstract base class that consists of a set of pure virtual functions defining its interface.

Figure 33:
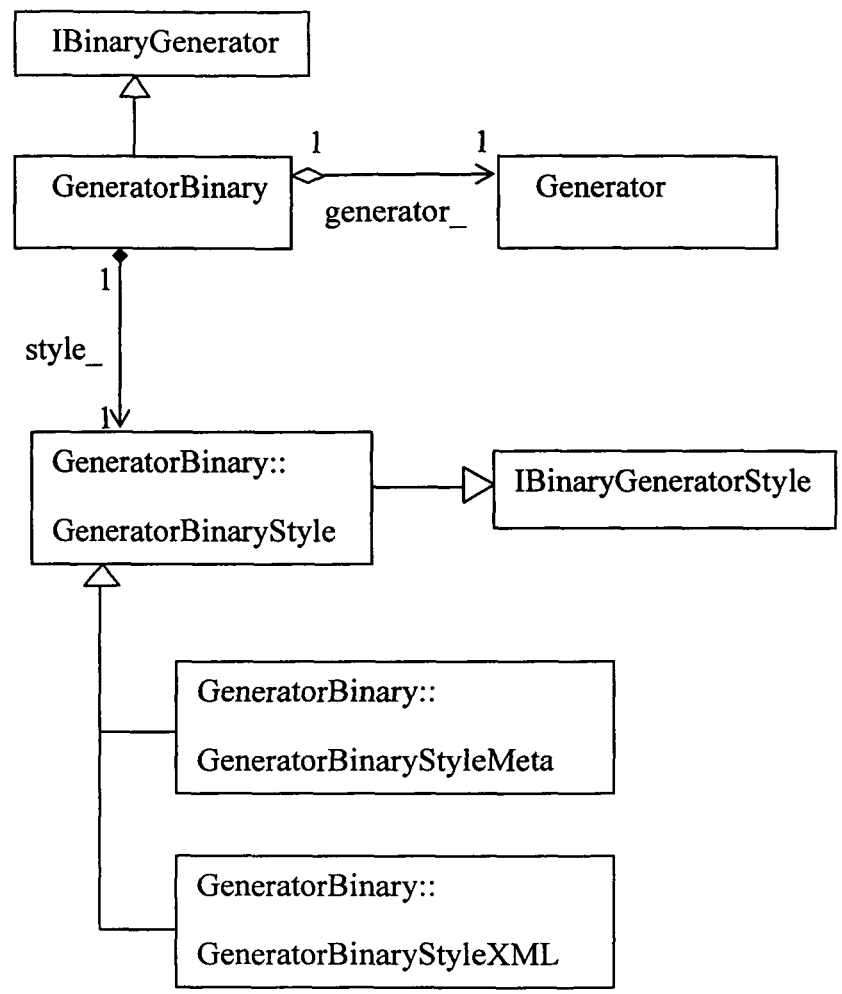
FIG. 33 shows a UML diagram of a compiler compiler generator GeneratorBinary class and its relationships with related classes.

FIG. 33 shows a UML diagram of compiler compiler generator GeneratorBinary class and its relationships with related classes. The GeneratorBinary class is a base class derived from IBinaryGenerator abstract base class that consists of a set of pure virtual functions defining its interface. The GeneratorBinary class has a reference generator_ to Generator class instance. The GeneratorBinary class instantiates style_ data member of type GeneratorBinary::GeneratorBinaryStyle* that will be replaced by std::shared_ptr<GeneratorBinary::GeneratorBinaryStyle> when std::shared_ptr will be widely available as C++ standard library class. The GeneratorBinary::GeneratorBinaryStyle is an abstract base class that is derived from IBinaryGeneratorStyle that consists of a set of pure virtual functions defining its interface. The GeneratorBinary::GeneratorBinaryStyleMeta and GeneratorBinary::GeneratorBinaryStyleXML classes are derived from GeneratorBinary::GeneratorBinaryStyle abstract base class.

The IBinaryGenerator abstract base class consists of the following pure virtual functions or their equivalents:

makeAlignment having formal argument token as a reference to Token returning void;

decompile having formal argument filename as a const reference to string returning void.

generate having formal argument filename as a const reference to string returning void.

The IRuntimeGenerator abstract base class consists of the following pure virtual functions or their equivalents:

makeAlignment having formal argument token as a reference to Token returning void;

decompile having formal argument filename as a const reference to string returning void;

generate having formal argument filename as a const reference to string returning void.

The IRuntimeGeneratorStyle abstract base class consists of the following pure virtual functions or their equivalents:

makeAlignment having formal argument token as a reference to Token returning void.

The IBinaryGeneratorStyle abstract base class consists of the following pure virtual functions or their equivalents:

makeAlignment having formal argument token as a reference to Token returning void.

Figure 34:
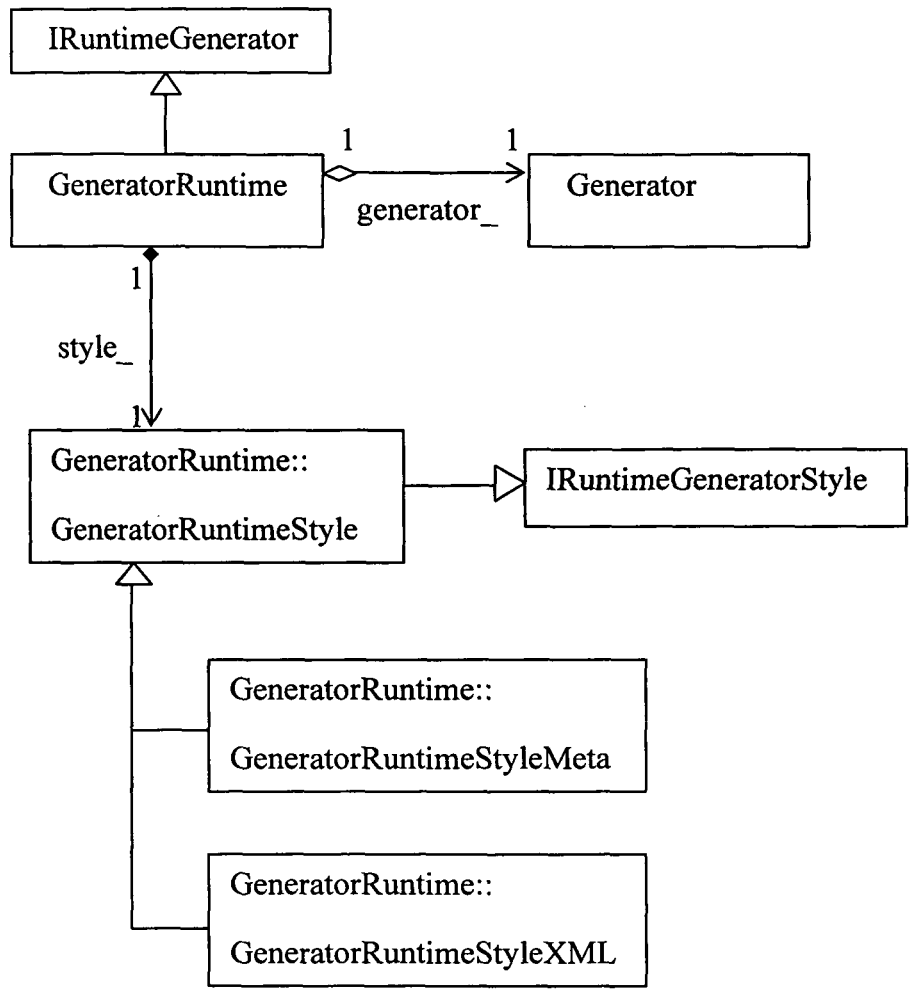
FIG. 34 shows a UML diagram of a compiler compiler generator GeneratorRuntime class and its relationships with related classes.

FIG. 34 shows a UML diagram of compiler compiler generator GeneratorRuntime class and its relationships with related classes. The GeneratorRuntime class is a base class derived from IRuntimeGenerator abstract base class that consists of a set of pure virtual functions defining its interface. The GeneratorRuntime class has a reference generator_ to Generator class instance. The GeneratorRuntime class instantiates style_ data member of type GeneratorRuntime::GeneratorRuntimeStyle* that will be replaced by std::shared_ptr<GeneratorRuntime::GeneratorRuntimeStyle> when std::shared_ptr will be widely available as C++ standard library class. The GeneratorRuntime::GeneratorRuntimeStyle is an abstract base class that is derived from IRuntimeGeneratorStyle that consists of a set of pure virtual functions defining its interface. The GeneratorRuntime::GeneratorRuntimeStyleMeta and GeneratorRuntime::GeneratorRuntimeStyleXML classes are derived from GeneratorRuntime::GeneratorRuntimeStyle abstract base class.

Figure 35:
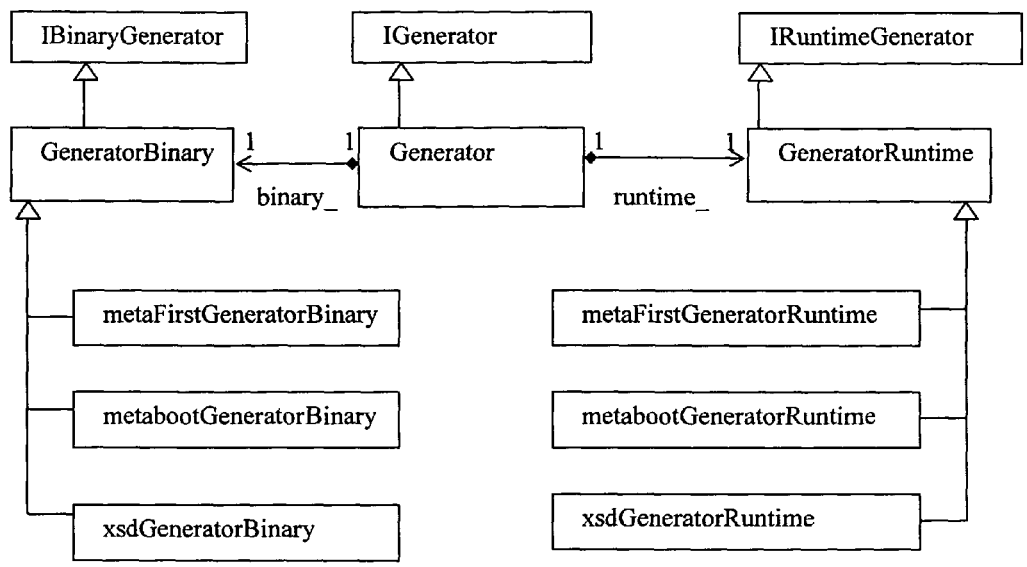
FIG. 35 shows a UML diagram of a target compiler's child classes derived from GeneratorBinary and GeneratorRuntime classes.

FIG. 35 shows a UML diagram of target compilers child classes derived from GeneratorBinary and GeneratorRuntime classes. Target compiler related classes such as metaFirstGeneratorBinary, metabootGeneratorBinary, xsdGeneratorBinary, and similar are derived from GeneratorBinary class. Target compiler related classes such as metaFirstGeneratorRuntime, metabootGeneratorRuntime, xsdGeneratorRuntime, and similar are derived from GeneratorRuntime class.

Figure 36:
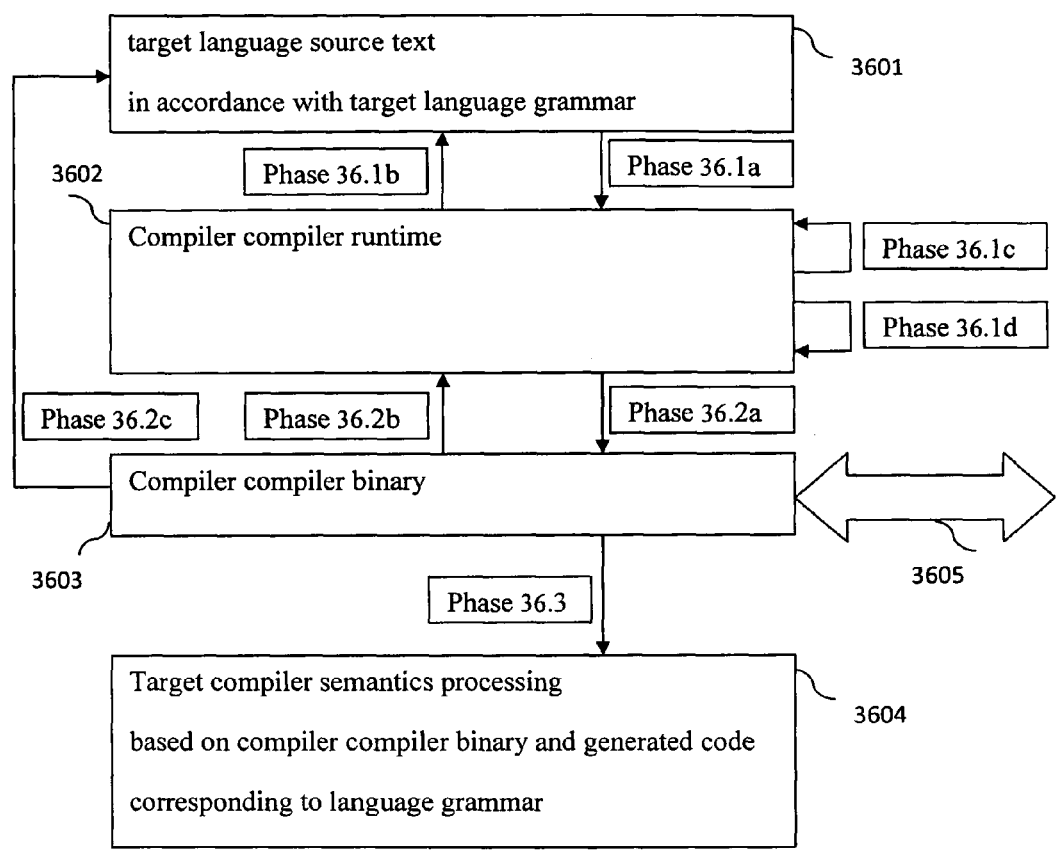
FIG. 36 shows target compiler standard and transformation phases performed in a multiplatform environment when a compiler compiler system builds a target compiler.

FIG. 36 shows built by compiler compiler system target compiler standard and transformation phases performed in multiplatform environment. This FIG. 36 is similar to FIG. 4 with additional elements. The phase 36.1c is a transformation of input compiler compiler runtime into output compiler compiler runtime. This type of transformation could be obfuscation, security protection, or content management. The phase 36.1d is a back transformation of output compiler compiler runtime into input compiler compiler runtime. The compiler compiler binary 3603 could be transmitted or received by 3605 in a binary format to/from other program. Those two sides of program to program communication can be implemented in different platforms, different operating systems, and different programming languages.

Figure 37:
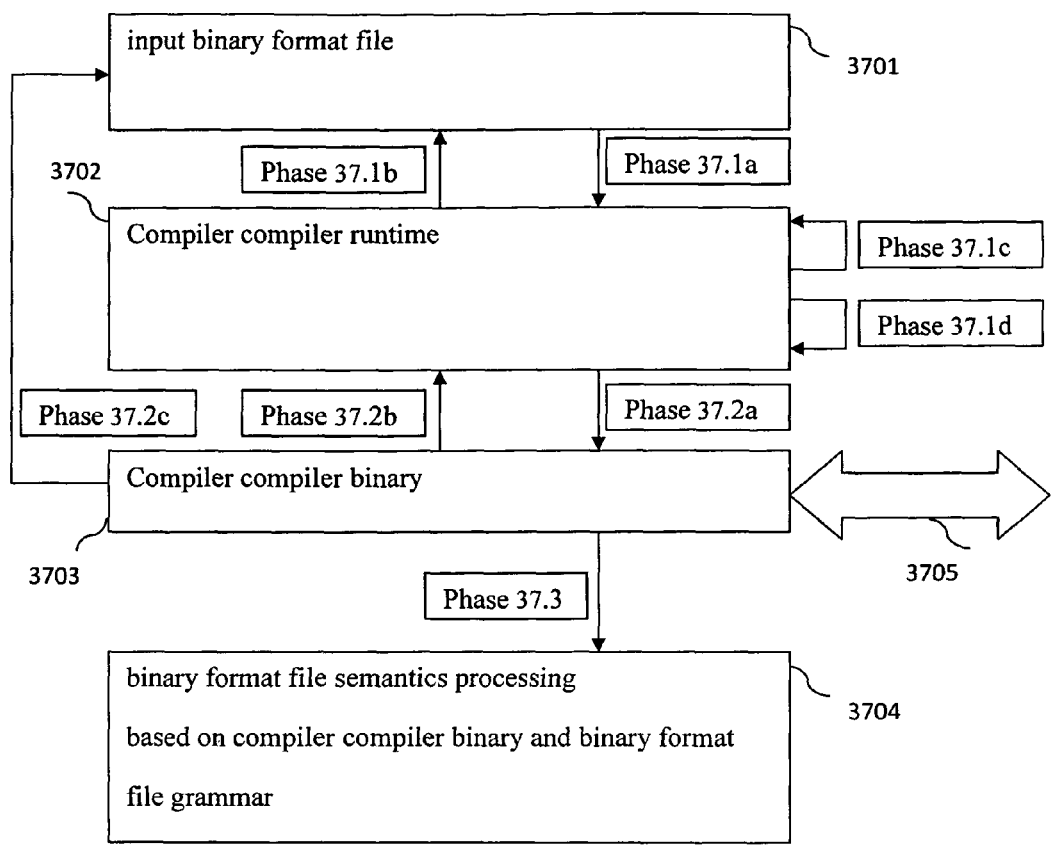
FIG. 37 shows binary files processing based on a compiler compiler system performing standard and transformation phases in a multiplatform environment.

FIG. 37 shows binary files processing based on compiler compiler system performing standard and transformation phases in multiplatform environment. FIG. 37 is similar to FIG. 36. It shows an idea of converting any binary file into compiler compiler runtime. This can be done in form of designing binary file format in term of compiler compiler source grammar definition language. A custom binary file format convertor is required that loads binary file content into compiler compiler runtime. Having compiler compiler runtime built all other operations of FIG. 37 are available for free.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A compiler compiler system comprising a non-transitory computer readable medium including
a compiler compiler executable program comprising a source code for a main routine that accepts a common set of program arguments specifying compile/de-compile modes interacting with the compiler compiler runtime, the compiler compiler binary, and the compiler compiler generator by means of the compiler compiler management,
a compiler compiler management comprising a management environment composed of compiler compiler management classes and their relationships;
the compiler compiler management classes including:
a logger class,
a run interface class,
a shell class,
a shell command enumerated type,
a key words container class,
a name vector container inner class of the key words container class,
a parser class,
a compiler class,
an action inner class of the compiler class,
a compile action inner class of the compiler class,
a de-compile action inner class of the compiler class,
a parser interface class,
a typedef tag,
a tokenizer class,
a line reader class,
a file line reader class,
a string line reader class,
a language class,
a token name container class,
a token name map container inner class of the token name container class,
a language interface class,
a language tokenizer set enumerated type,
a tokens class,
a name to index map container inner class of the tokens class,
a token vector container inner class of the tokens class,
a token interface class, and
a token class, and
their relationships including:
the shell class, the compiler class, and the action inner class of the compiler class being derived from the run interface class,
the shell class allocating an instance of the logger class, having a data member of the shell command enumerated type, and allocating a vector of shared pointers to instances of the compiler class,
the compiler class having a member reference to the shell class, allocating an instance of the parser class, and allocating a shared pointer to the action inner class of the compiler class,
the compile action inner class of the compiler class and the de-compile action inner class of the compiler class being derived from the action inner class of the compiler class,
the name vector container inner class of the key words container class being defined as a vector of strings,
the key words container class allocating the name vector container inner class of the key words container class for grammar terminals and non-terminals,
the parser class being derived from the parser interface class,
the parser class having member references to the logger class and to the key words container class,
the parser class having data members of the tag type representing current context and grammar axiom,
the parser class having Boolean flags as data members,
the parser class allocating instances of the syntax controlled runtime class, the syntax controlled binary class, the tokenizer class, and a generator class, the generator class being a member of the compiler compiler generator,
the tokenizer class having member references to the logger class, the key words container class, and the parser class,
the tokenizer class allocating instances of the token name container class, the line reader class, and the language class, the line reader class being a base class for derived classes including a file line reader class and a string line reader class, the language class being the base class for any target language specific derived classes, the token name container class having an instance of the token name map container inner class of the token name container class, the language class being derived from the language interface class, the language class having a member reference to the tokenizer class, the language class having a data member of the language tokenizer set enumerated type, the language class allocating instances of the tokens class for grammar tokens, key words, and non-terminals, the tokens class allocating an instance of the name to index map container inner class of the tokens class and the token vector container inner class of the tokens class, the name to index map container inner class of the tokens class being implemented as a map from a string representing a token name to an integer representing a token index in the token vector container inner class of the tokens class, the token vector container inner class of the tokens class being implemented as a vector of shared pointers to instances of the token class the token class being derived from the token interface class, the token class having a data member pointer to an instance of the tokenizer class, the token class having as a data member an integer representing a token id, the token class having as a data member a string representing a token name and a token value, and the token class being the base class to language specific tokens, a compiler compiler runtime, a compiler compiler binary, a compiler compiler generator comprising a generator environment composed of compiler compiler generator classes and their relationships;

the compiler compiler generator classes including:
  a generator interface class,
  a generator class,
  a binary generator interface class,
  a binary generator class,
  a binary generator style interface class,
  a binary generator style inner class of the binary generator class,
  a runtime generator interface class,
  a runtime generator class,
  a runtime generator style interface class, and
  a runtime generator style inner class of the runtime generator class, and their relationships including:
  the generator class being derived from the generator interface class, the generator class implementing the generator interface class methods, the generator class having a member reference to a parser class comprised in the compiler compiler management, the generator class having a data member of language tokenizer set enumerated type which is a member of the compiler compiler management, the generator class owning an instance of a shared pointer to the runtime generator class and an instance of a shared pointer to the binary generator class, the binary generator class being derived from the binary generator interface class, the binary generator class having a member reference to the generator class, the binary generator class owning an instance of a shared pointer to the binary generator style inner class, the binary generator style inner class of the binary generator class being derived from the binary generator style interface class, the binary generator style inner class of the binary generator class being a parent class for any binary generator target language specific style inner class of the binary generator class, any binary generator target language specific style inner class of the binary generator class implementing the binary generator style interface class methods, the runtime generator class being derived from the runtime generator interface class, the runtime generator class having a member reference to the generator class, the runtime generator class owning an instance of a shared pointer to the runtime generator style inner class, the runtime generator style inner class of the runtime generator class being derived from the runtime generator style interface class, the runtime generator style inner class of the runtime generator class being a parent class for any runtime generator target language specific style inner class of the runtime generator class, and any runtime generator target language specific style inner class of the runtime generator class implementing the runtime generator style interface class methods, a compiler compiler source grammar definition language, and a compiler compiler parsing model, wherein the compiler compiler executable program performs an operation selected from the group consisting of:

calling a compiler compiler parser that performs a compilation from source text according to the compiler compiler source grammar definition language to the compiler compiler runtime, calling the compiler compiler generator, the compiler compiler generator performing formal de-compilation from the compiler compiler runtime into source text according to the compiler compiler source grammar definition language, calling the compiler compiler generator, the compiler compiler generator performing a formal conversion of the compiler compiler runtime into the compiler compiler binary, calling the compiler compiler generator, the compiler compiler generator performing formal de-compilation from compiler compiler binary into source text according to the compiler compiler source grammar definition language, calling the compiler compiler generator, the compiler compiler generator performing formal de-compilation from the compiler compiler binary into the compiler compiler runtime, calling the compiler compiler generator, the compiler compiler generator performing target compiler code generation, and wherein the compiler compiler executable program performs compilation and de-compilation automatically without any additional code implementation processing target language grammar defined in the compiler compiler grammar source definition language source text.

2. The compiler compiler system of claim 1, the compiler compiler parsing model comprising a parsing logical view composed of compiler compiler parsing model classes and their relationships;

the compiler compiler parsing model classes including:
   a context class,
   a name class,
   a symbol class, and
   a rule class; and their relationships including:
   a collection of instances of the context class representing parsing results,
   a collection of instances of the name class defined in each instance of the context class, the name instances ordered by a string name corresponding to each name instance,
   a collection of instances of the name class defined in each of said context instances, said name instances ordered by a sequential index corresponding to each name instance,
   a collection of instances of the symbol class defined in each of said context instances, said symbol instances ordered by a symbol ID corresponding each symbol instance, and
   a collection of instances of the rule class defined in each of said symbol instances, said rule instances ordered by a rule invocation ID corresponding to each rule instance.

3. The compiler compiler system of claim 1, the compiler compiler runtime comprising a runtime environment composed of compiler compiler runtime classes and their relationships;

the compiler compiler runtime classes including:
   a context class,
   a name class,
   a symbol class, and
   a rule class; and their relationships including:
   a collection of instances of the context class representing parsing results,
   a collection of instances of the name class defined in each instance of the context class, the name instances ordered by a string name corresponding to each name instance,
   a collection of instances of the name class defined in each of said context instances, said name instances ordered by a sequential index corresponding to each name instance,
   a collection of instances of the symbol class defined in each of said context instances, said symbol instances ordered by a symbol ID corresponding each symbol instance, and
   a collection of instances of the rule class defined in each of said symbol instances, said rule instances ordered by a rule invocation ID corresponding to each rule instance.

4. The compiler compiler system of claim 1, the compiler compiler binary comprising a binary environment in form of compiler compiler binary classes and their relationships the compiler compiler binary classes including
   a context class,
   a name class,
   a symbol class, and
   a rule class; and their relationships including:
   a collection of instances of the context class representing parsing results,
   a collection of instances of the name class defined in each instance of the context class, the name instances ordered by a string name corresponding to each name instance,
   a collection of instances of the name class defined in each of said context instances, said name instances ordered by a sequential index corresponding to each name instance,
   a collection of instances of the symbol class defined in each of said context instances, said symbol instances ordered by a symbol ID corresponding each symbol instance, and
   a collection of instances of the rule class defined in each of said symbol instances, said rule instances ordered by a rule invocation ID corresponding to each rule instance.

5. The compiler compiler system of claim 1, the compilation and de-compilation phases being performed automatically and the system being configured to implement any kind of semantics processing as subsequent phases based on compiler compiler binary.

6. The compiler compiler system of claim 1, designed to perform a whole compilation process under supervision of the compiler compiler management with parsing results to be represented in two interchangeable forms, namely, compiler compiler runtime and binary, both designed in accordance with the compiler compiler parsing model, the compiler compiler parsing model being common to the compiler compiler runtime and binary.

7. The compiler compiler system of claim 6, wherein the compiler compiler runtime is designed to serve parsing processing during source code compilation, and the compiler compiler binary is designed to serve as an optimized, interchangeable, and independent multiplatform data exchange protocol for any subsequent processing.

8. The compiler compiler system of claim 3, the compiler compiler runtime defined as a syntax controlled runtime class designed to provide a compiler compiler runtime view of the compiler compiler parsing model;

the syntax controlled runtime class defining a compiler compiler runtime syntax-controlled API composed of methods of syntax controlled runtime inner classes and their relationships;

the compiler compiler runtime syntax-controlled API capable of being invoked from any generated parser.

9. The compiler compiler system of claim 4, the compiler compiler binary defined as a syntax controlled binary class designed to provide a compiler compiler binary view of the compiler compiler parsing model;

the syntax controlled binary class defining a compiler compiler binary syntax-controlled API composed of methods of syntax controlled binary inner classes and their relationships;

the context inner class of the syntax controlled binary class having only one data member representing memory allocated as a standard library vector container to be used as a single memory resource for allocating all syntax controlled binary inner class instances and their relationships; and the compiler compiler binary syntax-controlled API capable of being invoked from any application performing semantics processing.

10. The compiler compiler system of claim 9, wherein the compiler compiler binary is a multiplatform data exchange protocol for any subsequent semantics processing.

11. The compiler compiler system of claim 1, wherein source codes of the compiler compiler runtime, binary, generator, and management are compiled into a compiler compiler foundation library that is used by compiler compiler executable program and any other target compiler built by means of compiler compiler system.

12. The compiler compiler system according to claim 1, wherein the compiler compiler generator creates generated code for a given compiler compiler source grammar definition language description and that generated code is compiled into generated library and target compiler executable program is compiled and built with compiler compiler foundation library and generated library; built this way target compiler executable program has compile and de-compile operations ready; all semantics processing can be done as independent subsequent operations implemented using compiler compiler binary syntax-controlled API.

13. The compiler compiler system according to claim 1, wherein the compiler compiler management, generator, runtime and binary serve as a multiplatform foundation based on compiler compiler runtime and binary transformations for researching and developing new types of products such as binary files processing, and communication between programs running on different platforms, programs running on the same platform, programs running on different operating systems, programs running on the same operating system, programs built using different programming languages, and programs built using the same programming language.

14. The compiler compiler system according to claim 1, wherein the compiler compiler management, generator, runtime and binary serve as a multiplatform foundation based on compiler compiler runtime and binary transformations for researching and developing new types of products including obfuscation, security protection, content management, and any other formal compiler compiler binary transformations implemented for particular cases.

15. The compiler compiler system according to claim 1, wherein the compiler compiler management, generator, runtime and binary serve as a multiplatform foundation for researching and developing new types of products based on binary files processing when existing binary file formats representing documents, audio, and video are transformed in form of compiler compiler source grammar definition language binary file format specification; followed by implementation of binary file convertor from its binary content into compiler compiler runtime having compiler compiler binary created by formal compiler compiler phase.

16. A compiler compiler method comprising:
providing a non-transitory computer readable medium including
a compiler compiler executable program comprising a source code for a main routine that accepts a common set of program arguments specifying compile/de-compile modes interacting with the compiler compiler runtime, the compiler compiler binary, and the compiler compiler generator by means of the compiler compiler management, a compiler compiler management comprising a management environment composed of compiler compiler management classes and their relationships;
the compiler compiler management classes including:
a logger class,
a run interface class,
a shell class,
a shell command enumerated type,
a key words container class,
a name vector container inner class of the key words container class,
a parser class,
a compiler class,
an action inner class of the compiler class,
a compile action inner class of the compiler class,
a de-compile action inner class of the compiler class,
a parser interface class,
a typedef tag,
a tokenizer class,
a line reader class,
a file line reader class,
a string line reader class,
a language class,
a token name container class,
a token name map container inner class of the token name container class,
a language interface class,
a language tokenizer set enumerated type,
a tokens class,
a name to index map container inner class of the tokens class,
a token vector container inner class of the tokens class,
a token interface class,
a token class, and
their relationships including:
the shell class, the compiler class, and the action inner class of the compiler class being derived from the run interface class,
the shell class allocating an instance of the logger class, having a data member of the shell command enumerated type, and allocating a vector of shared pointers to instances of the compiler class,
the compiler class having a member reference to the shell class, allocating an instance of the parser class, and allocating a shared pointer to the action inner class of the compiler class,
the compile action inner class of the compiler class and the de-compile action inner class of the compiler class being derived from the action inner class of the compiler class,
the name vector container inner class of the key words container class being defined as a vector of strings,
the key words container class allocating the name vector container inner class of the key words container class for grammar terminals and non-terminals,
the parser class being derived from the parser interface class,
the parser class having member references to the logger class and to the key words container class,
the parser class having data members of the tag type representing current context and grammar axiom,
the parser class having Boolean flags as data members,
the parser class allocating instances of the syntax controlled runtime class, the syntax controlled binary class, the tokenizer class, and a generator class, the generator class being a member of the compiler compiler generator, the tokenizer class having member references to the logger class, the key words container class, and the parser class, the tokenizer class allocating instances of the token name container class, the line reader class, and the language class, the line reader class being a base class for derived classes including a file line reader class and a string line reader class, the language class being the base class for any target language specific derived classes, the token name container class having an instance of the token name map container inner class of the token name container class, the language class being derived from the language interface class, the language class having a member reference to the tokenizer class, the language class having a data member of the language tokenizer set enumerated type, the language class allocating instances of the tokens class for grammar tokens, key words, and non-terminals, the tokens class allocating an instance of the name to index map container inner class of the tokens class and the token vector container inner class of the tokens class, the name to index map container inner class of the tokens class being implemented as a map from a string representing a token name to an integer representing a token index in the token vector container inner class of the tokens class, the token vector container inner class of the tokens class being implemented as a vector of shared pointers to instances of the token class the token class being derived from the token interface class, the token class having a data member pointer to an instance of the tokenizer class, the token class having as a data member an integer representing a token id, the token class having as a data member a string representing a token name and a token value, and the token class being the base class to language specific tokens, a compiler compiler runtime, a compiler compiler binary, a compiler compiler generator comprising a generator environment composed of compiler compiler generator classes and their relationships;

the compiler compiler generator classes including:
  a generator interface class,
  a generator class,
  a binary generator interface class,
  a binary generator class,
  a binary generator style interface class,
  a binary generator style inner class of the binary generator class,
  a runtime generator interface class,
  a runtime generator class,
  a runtime generator style interface class,
  a runtime generator style inner class of the runtime generator class, and their relationships including:
  the generator class being derived from the generator interface class, the generator class implementing the generator interface class methods, the generator class having a member reference to a parser class comprised in the compiler compiler management, the generator class having a data member of language tokenizer set enumerated type which is a member of the compiler compiler management, the generator class owning an instance of a shared pointer to the runtime generator class and an instance of a shared pointer to the binary generator class, the binary generator class being derived from the binary generator interface class, the binary generator class having a member reference to the generator class, the binary generator class owning an instance of a shared pointer to the binary generator style inner class, the binary generator style inner class of the binary generator class being derived from the binary generator style interface class, the binary generator style inner class of the binary generator class being a parent class for any binary generator target language specific style inner class of the binary generator class, any binary generator target language specific style inner class of the binary generator class implementing the binary generator style interface class methods, the runtime generator class being derived from the runtime generator interface class, the runtime generator class having a member reference to the generator class, the runtime generator class owning an instance of a shared pointer to the runtime generator style inner class, the runtime generator style inner class of the runtime generator class being derived from the runtime generator style interface class, the runtime generator style inner class of the runtime generator class being a parent class for any runtime generator target language specific style inner class of the runtime generator class, and any runtime generator target language specific style inner class of the runtime generator class implementing the runtime generator style interface class methods, a compiler compiler source grammar definition language, and a compiler compiler parsing model, and executing the compiler compiler executable program to perform an operation selected from the group consisting of:

calling a compiler compiler parser that performs a compilation from source text according to the compiler compiler source grammar definition language to the compiler compiler runtime, calling the compiler compiler generator, the compiler compiler generator performing formal de-compilation from the compiler compiler runtime into source text according to the compiler compiler source grammar definition language, calling the compiler compiler generator, the compiler compiler generator performing a formal conversion of the compiler compiler runtime into the compiler compiler binary, calling the compiler compiler generator, the compiler compiler generator performing formal de-compilation from compiler compiler binary into source text according to the compiler compiler source grammar definition language, calling the compiler compiler generator, the compiler compiler generator performing formal de-compilation from the compiler compiler binary into the compiler compiler runtime, calling the compiler compiler generator, the compiler compiler generator performing target compiler code generation, wherein the compiler compiler executable program performs compilation and de-compilation automatically without any additional code implementation processing target language grammar defined in the compiler compiler grammar source definition language source text.

17. A method of securely transmitting data comprising performing the compiler compiler method of claim 16 and further comprising:

providing a computer to read the non-transitory computer readable medium, using the computer to represent a data structure in the compiler compiler source grammar definition language;

using the computer to execute the compiler compiler executable program to create a data compiler executable program linked from compiled compiler compiler executable program text, the compiler compiler foundation library, and a data compiler generated library created as a result of compilation of the data structure represented in the compiler compiler source grammar definition language by executing the compiler compiler executable program;

using the computer to execute the data compiler executable program to convert the data into a data compiler compiler runtime;

using the computer to execute a transformation algorithm to convert the data compiler compiler runtime into a transformed data compiler compiler runtime based on the compiler compiler runtime syntax-controlled API;

using the computer to execute the data compiler executable program to convert the transformed data compiler compiler runtime into a transformed data compiler compiler binary;

using the computer to execute a transformation algorithm to convert the transformed data compiler compiler binary into secondary transformed data compiler compiler binary based on the compiler compiler binary syntax-controlled API;

using the computer to transmit the secondary transformed data compiler compiler binary to a receiving computer;

using the receiving computer to execute a backward transformation algorithm to convert the secondary transformed data compiler compiler binary back to the transformed data compiler compiler binary;

using the receiving computer to execute the compiler compiler executable program to convert the transformed data compiler compiler binary into the transformed data compiler compiler runtime;

using the receiving computer to execute a backward transformation algorithm to convert the transformed data compiler compiler runtime back to the data compiler compiler runtime;

using the receiving computer to execute the compiler compiler executable program to convert the data compiler compiler runtime into the data compiler compiler binary; and using the receiving computer to perform subsequent semantics processing of the data compiler compiler binary based on compiler compiler binary syntax-controlled API.

* * * * *

UNITED STATES PATENT AND TRADEMARK OFFICE
CERTIFICATE OF CORRECTION

PATENT NO.       : 8,464,232 B2
APPLICATION NO.  : 12/930073
DATED            : June 11, 2013
INVENTOR(S)      : Aleksandr F. Urakhchin Page 1 of 1

It is certified that error appears in the above-identified patent and that said Letters Patent is hereby corrected as shown below:

In the Specification,

Column 20, line 24, delete "tokenizes" and insert therefor --tokenizer_--

Signed and Sealed this
Thirtieth Day of July, 2013

Teresa Stanek Rea
*Acting Director of the United States Patent and Trademark Office*